US008365185B2

(12) United States Patent
Bobak et al.

(10) Patent No.: US 8,365,185 B2
(45) Date of Patent: Jan. 29, 2013

(54) PREVENTING EXECUTION OF PROCESSES RESPONSIVE TO CHANGES IN THE ENVIRONMENT

(75) Inventors: Mythili K. Bobak, Lagrangeville, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 11/965,978

(22) Filed: Dec. 28, 2007

(65) Prior Publication Data
US 2009/0172682 A1 Jul. 2, 2009

(51) Int. Cl.
| G06F 9/46 | (2006.01) |
| G06F 15/173 | (2006.01) |
| G06F 11/00 | (2006.01) |
| G06Q 10/00 | (2012.01) |

(52) U.S. Cl. ............... 718/106; 718/103; 714/1; 714/2; 709/223; 705/7.27; 705/7.38

(58) Field of Classification Search .................. 718/103
See application file for complete search history.

(56) References Cited

U.S. PATENT DOCUMENTS

| 5,023,873 A | | 6/1991 | Stevenson et al. ............ 371/8.2 |
| 5,386,561 A | * | 1/1995 | Huynh et al. ................. 718/103 |
| 5,452,452 A | * | 9/1995 | Gaetner et al. ............... 718/103 |
| 5,481,694 A | | 1/1996 | Chao et al. ................... 395/439 |
| 5,537,542 A | | 7/1996 | Eilert et al. |
| 5,604,863 A | | 2/1997 | Allen et al. |
| 5,631,831 A | | 5/1997 | Bird et al. |
| 5,652,908 A | | 7/1997 | Douglas et al. |
| 5,734,837 A | | 3/1998 | Flores et al. |
| 5,790,780 A | | 8/1998 | Brichta et al. |
| 5,797,005 A | | 8/1998 | Bahls et al. |
| 5,797,129 A | | 8/1998 | Rohan |
| 5,826,080 A | * | 10/1998 | Dworzecki ................... 718/103 |
| 5,887,168 A | | 3/1999 | Bahls et al. |
| 6,012,044 A | | 1/2000 | Maggioncalda et al. |
| 6,012,152 A | | 1/2000 | Douik et al. |
| 6,041,306 A | | 3/2000 | Du et al. |
| 6,336,138 B1 | | 1/2002 | Caswell et al. |
| 6,385,613 B1 | | 5/2002 | Grewell et al. ................. 707/8 |
| 6,393,386 B1 | | 5/2002 | Zager et al. |
| 6,393,485 B1 | | 5/2002 | Chao et al. ................... 709/231 |
| 6,408,277 B1 | * | 6/2002 | Nelken ........................ 705/7.15 |
| 6,449,688 B1 | | 9/2002 | Peters et al. ................... 711/112 |

(Continued)

FOREIGN PATENT DOCUMENTS
WO WO 99/10814 3/1999

OTHER PUBLICATIONS

Office Action for U.S. Appl. No. 11/966,495 dated Oct. 29, 2009.

(Continued)

*Primary Examiner* — Jennifer To
(74) *Attorney, Agent, or Firm* — Dennis Jung, Esq.; Blanche E. Schiller, Esq.; Heslin Rothenberg Farley & Mesiti P.C.

(57) ABSTRACT

Processes are programmatically categorized into a plurality of categories, which are prioritized. Serialization is used to control execution of the processes of the various categories. The serialization ensures that processes of higher priority categories are given priority in execution. This includes temporarily preventing processes of lower priority categories from being executed.

16 Claims, 23 Drawing Sheets

U.S. PATENT DOCUMENTS

| | | | |
|---|---|---|---|
| 6,480,944 B2 | 11/2002 | Bradshaw et al. | |
| 6,625,751 B1 | 9/2003 | Starovic et al. | |
| 6,732,118 B2 | 5/2004 | Hermann et al. | |
| 6,785,768 B2 | 8/2004 | Peters et al. | 711/112 |
| 6,862,696 B1 | 3/2005 | Voas et al. | |
| 6,874,010 B1 | 3/2005 | Sargent | |
| 6,934,247 B2 | 8/2005 | Bhattal et al. | 370/216 |
| 6,954,786 B1 | 10/2005 | Vered et al. | |
| 6,983,321 B2 | 1/2006 | Trinon et al. | |
| 6,983,362 B1 | 1/2006 | Kidder et al. | |
| 7,032,186 B1 | 4/2006 | Gasser et al. | |
| 7,047,337 B2 | 5/2006 | Armstrong et al. | |
| 7,058,947 B1* | 6/2006 | Raja et al. | 718/104 |
| 7,111,297 B1* | 9/2006 | Sankaranarayan et al. | 718/104 |
| 7,197,749 B2 | 3/2007 | Thornton et al. | |
| 7,243,267 B2 | 7/2007 | Klemm et al. | |
| 7,313,573 B2 | 12/2007 | Leung et al. | |
| 7,325,161 B1 | 1/2008 | Rakic et al. | |
| 7,395,537 B1 | 7/2008 | Brown et al. | |
| 7,409,356 B1 | 8/2008 | Geddes et al. | |
| 7,437,611 B2 | 10/2008 | Agarwal et al. | |
| 7,490,265 B2 | 2/2009 | Baskey et al. | |
| 7,499,954 B2 | 3/2009 | Cherkauer et al. | |
| 7,509,529 B2 | 3/2009 | Colucci et al. | |
| 7,529,981 B2 | 5/2009 | Childress et al. | |
| 7,536,585 B1 | 5/2009 | Keeton et al. | |
| 7,568,019 B1 | 7/2009 | Bhargava et al. | |
| 7,587,483 B1 | 9/2009 | Florissi et al. | |
| 7,610,512 B2 | 10/2009 | Gerber | |
| 7,620,953 B1 | 11/2009 | Tene et al. | |
| 7,627,728 B1 | 12/2009 | Roeck et al. | |
| 7,650,341 B1 | 1/2010 | Oratovsky et al. | |
| 7,707,173 B2 | 4/2010 | Nanavati et al. | |
| 7,730,363 B2 | 6/2010 | Takezawa et al. | |
| 7,743,001 B1 | 6/2010 | Vermeulen et al. | |
| 7,747,730 B1 | 6/2010 | Harlow | |
| 7,752,310 B2 | 7/2010 | Kageyama | |
| 7,774,457 B1 | 8/2010 | Talwar et al. | |
| 7,774,458 B2 | 8/2010 | Trinon et al. | |
| 7,818,421 B2* | 10/2010 | Machida | 709/224 |
| 7,865,582 B1 | 1/2011 | Santos et al. | |
| 7,933,872 B2 | 4/2011 | Kulkarni et al. | |
| 7,934,119 B2 | 4/2011 | Takamoto et al. | |
| 7,937,706 B2* | 5/2011 | Casotto | 718/103 |
| 7,958,393 B2* | 6/2011 | Bobak et al. | 714/15 |
| 7,962,590 B1 | 6/2011 | Or et al. | |
| 8,051,106 B2 | 11/2011 | Bird | |
| 8,260,893 B1 | 9/2012 | Bandhole et al. | |
| 2001/0056398 A1 | 12/2001 | Scheirer | |
| 2001/0056554 A1 | 12/2001 | Chrabaszcz | |
| 2002/0022952 A1 | 2/2002 | Zager et al. | |
| 2002/0049749 A1 | 4/2002 | Helgeson et al. | |
| 2002/0059512 A1 | 5/2002 | Desjardins | |
| 2002/0069102 A1 | 6/2002 | Vellante et al. | |
| 2002/0078130 A1 | 6/2002 | Thornton et al. | |
| 2002/0078381 A1 | 6/2002 | Farley et al. | |
| 2002/0091991 A1 | 7/2002 | Castro | |
| 2002/0194045 A1 | 12/2002 | Shay et al. | |
| 2002/0198727 A1 | 12/2002 | Ann et al. | |
| 2003/0051186 A1 | 3/2003 | Boudnik et al. | |
| 2003/0056013 A1 | 3/2003 | Laschkewitsch et al. | |
| 2003/0078823 A1 | 4/2003 | Yoshioka et al. | |
| 2003/0084100 A1 | 5/2003 | Gahan et al. | |
| 2003/0093672 A1 | 5/2003 | Cichowlas | |
| 2003/0135384 A1 | 7/2003 | Nguyen | |
| 2003/0139956 A1 | 7/2003 | Guenther et al. | |
| 2003/0200482 A1 | 10/2003 | Sullivan | |
| 2003/0212580 A1 | 11/2003 | Shen | |
| 2003/0212685 A1 | 11/2003 | Rakotoarivelo et al. | |
| 2003/0225602 A1 | 12/2003 | Hagmann et al. | |
| 2003/0236677 A1 | 12/2003 | Casati et al. | |
| 2004/0034553 A1 | 2/2004 | Cole et al. | |
| 2004/0054690 A1 | 3/2004 | Hillerbrand et al. | |
| 2004/0078373 A1 | 4/2004 | Ghoneimy et al. | |
| 2004/0119752 A1 | 6/2004 | Beringer et al. | |
| 2004/0143470 A1 | 7/2004 | Myrick et al. | |
| 2004/0158777 A1 | 8/2004 | Bae et al. | 714/47 |
| 2004/0162741 A1 | 8/2004 | Flaxer et al. | |
| 2004/0181476 A1 | 9/2004 | Smith et al. | |
| 2004/0186905 A1 | 9/2004 | Young et al. | |
| 2004/0193476 A1* | 9/2004 | Aerdts | 705/10 |
| 2004/0199768 A1 | 10/2004 | Nail | |
| 2004/0210452 A1 | 10/2004 | Aboujaoude et al. | |
| 2004/0243699 A1 | 12/2004 | Koclanes et al. | |
| 2005/0015641 A1 | 1/2005 | Alur et al. | |
| 2005/0033600 A1 | 2/2005 | Geddes et al. | |
| 2005/0043977 A1 | 2/2005 | Ahern et al. | |
| 2005/0049906 A1 | 3/2005 | Leymann et al. | |
| 2005/0060662 A1 | 3/2005 | Soares et al. | |
| 2005/0071470 A1 | 3/2005 | O'Brien et al. | |
| 2005/0086091 A1 | 4/2005 | Trumbly et al. | |
| 2005/0091351 A1 | 4/2005 | Badovinatz et al. | |
| 2005/0096949 A1 | 5/2005 | Aiber et al. | |
| 2005/0119905 A1 | 6/2005 | Wong et al. | |
| 2005/0125768 A1 | 6/2005 | Wong et al. | |
| 2005/0172306 A1 | 8/2005 | Agarwal et al. | |
| 2005/0177406 A1 | 8/2005 | Facciorusso et al. | |
| 2005/0198244 A1 | 9/2005 | Eilam et al. | |
| 2005/0228852 A1 | 10/2005 | Santos et al. | |
| 2005/0235248 A1 | 10/2005 | Victoria et al. | |
| 2005/0262242 A1 | 11/2005 | Byers et al. | |
| 2006/0004265 A1 | 1/2006 | Pulkkinen et al. | |
| 2006/0010234 A1 | 1/2006 | Reedy et al. | |
| 2006/0020866 A1 | 1/2006 | Lo et al. | |
| 2006/0037022 A1 | 2/2006 | Byrd et al. | |
| 2006/0041505 A1 | 2/2006 | Enyart | |
| 2006/0064335 A1 | 3/2006 | Goldszmidt et al. | |
| 2006/0074731 A1 | 4/2006 | Green et al. | |
| 2006/0074736 A1 | 4/2006 | Shukla et al. | |
| 2006/0074993 A1 | 4/2006 | Pulamarasetti et al. | |
| 2006/0106626 A1 | 5/2006 | Jeng et al. | |
| 2006/0111921 A1 | 5/2006 | Chang et al. | |
| 2006/0112383 A1 | 5/2006 | Chang et al. | |
| 2006/0117221 A1 | 6/2006 | Fisher et al. | |
| 2006/0123022 A1 | 6/2006 | Bird | |
| 2006/0129562 A1 | 6/2006 | Pulamarasetti et al. | |
| 2006/0149842 A1 | 7/2006 | Dawson et al. | |
| 2006/0161466 A1 | 7/2006 | Trinon et al. | |
| 2006/0179136 A1 | 8/2006 | Loboz et al. | |
| 2006/0190368 A1 | 8/2006 | Kesterman | |
| 2006/0190583 A1 | 8/2006 | Whalen | |
| 2006/0190775 A1 | 8/2006 | Aggarwal et al. | |
| 2006/0218558 A1 | 9/2006 | Torii et al. | |
| 2006/0224702 A1 | 10/2006 | Schmidt et al. | |
| 2006/0245354 A1 | 11/2006 | Gao et al. | |
| 2006/0245369 A1 | 11/2006 | Schimmelpfeng et al. | |
| 2006/0248546 A1 | 11/2006 | Andreev et al. | |
| 2006/0259526 A1 | 11/2006 | Booz et al. | |
| 2006/0287875 A1 | 12/2006 | Reddy et al. | |
| 2006/0293942 A1 | 12/2006 | Chaddha et al. | |
| 2007/0011331 A1 | 1/2007 | Morimoto et al. | |
| 2007/0027734 A1 | 2/2007 | Hughes | |
| 2007/0038490 A1 | 2/2007 | Joodi | |
| 2007/0038492 A1 | 2/2007 | Ryan et al. | |
| 2007/0067296 A1 | 3/2007 | Malloy et al. | |
| 2007/0079097 A1 | 4/2007 | Karnowski et al. | |
| 2007/0100712 A1 | 5/2007 | Kilpatrick et al. | |
| 2007/0112847 A1 | 5/2007 | Dublish et al. | |
| 2007/0143166 A1 | 6/2007 | Leymann et al. | |
| 2007/0150571 A1 | 6/2007 | Haga et al. | |
| 2007/0165525 A1 | 7/2007 | Kageyama | |
| 2007/0179826 A1 | 8/2007 | Cutlip et al. | |
| 2007/0198678 A1 | 8/2007 | Dieberger et al. | |
| 2007/0234408 A1 | 10/2007 | Burch et al. | |
| 2007/0266029 A1 | 11/2007 | Baskey et al. | |
| 2007/0271219 A1 | 11/2007 | Agarwal et al. | |
| 2007/0276885 A1 | 11/2007 | Valiyaparambil et al. | |
| 2007/0286219 A1 | 12/2007 | Knop et al. | |
| 2007/0294406 A1 | 12/2007 | Suer et al. | |
| 2007/0300204 A1 | 12/2007 | Andreev et al. | |
| 2008/0005739 A1 | 1/2008 | Sadiq et al. | |
| 2008/0016335 A1 | 1/2008 | Takahashi et al. | |
| 2008/0052719 A1 | 2/2008 | Briscoe et al. | |
| 2008/0063423 A1 | 3/2008 | Matoba | |
| 2008/0140495 A1 | 6/2008 | Bhamidipaty et al. | |
| 2008/0215909 A1 | 9/2008 | Bretschneider et al. | |
| 2008/0294777 A1 | 11/2008 | Karve et al. | |

| | | | |
|---|---|---|---|
| 2008/0295100 A1* | 11/2008 | Ainsworth | 718/102 |
| 2008/0317217 A1 | 12/2008 | Bernardini et al. | |
| 2009/0037363 A1 | 2/2009 | Kozlov et al. | |
| 2009/0077210 A1 | 3/2009 | Musman et al. | |
| 2009/0125751 A1 | 5/2009 | Dawson et al. | |
| 2009/0150456 A1 | 6/2009 | Balasubramanian et al. | |
| 2009/0150887 A1 | 6/2009 | Sanghvi et al. | |
| 2009/0171703 A1 | 7/2009 | Bobak et al. | |
| 2009/0171704 A1 | 7/2009 | Bobak et al. | |
| 2009/0171705 A1 | 7/2009 | Bobak et al. | |
| 2009/0171706 A1 | 7/2009 | Bobak et al. | |
| 2009/0171707 A1 | 7/2009 | Bobak et al. | |
| 2009/0171708 A1 | 7/2009 | Bobak et al. | |
| 2009/0171730 A1 | 7/2009 | Bobak et al. | |
| 2009/0171731 A1 | 7/2009 | Bobak et al. | |
| 2009/0171732 A1 | 7/2009 | Bobak et al. | |
| 2009/0171733 A1 | 7/2009 | Bobak et al. | |
| 2009/0172149 A1 | 7/2009 | Bobak et al. | |
| 2009/0172460 A1 | 7/2009 | Bobak et al. | |
| 2009/0172461 A1 | 7/2009 | Bobak et al. | |
| 2009/0172470 A1 | 7/2009 | Bobak et al. | |
| 2009/0172668 A1 | 7/2009 | Bobak et al. | |
| 2009/0172669 A1 | 7/2009 | Bobak et al. | |
| 2009/0172670 A1 | 7/2009 | Bobak et al. | |
| 2009/0172671 A1 | 7/2009 | Bobak et al. | |
| 2009/0172674 A1 | 7/2009 | Bobak et al. | |
| 2009/0172687 A1 | 7/2009 | Bobak et al. | |
| 2009/0172688 A1 | 7/2009 | Bobak et al. | |
| 2009/0172689 A1 | 7/2009 | Bobak et al. | |
| 2009/0172769 A1 | 7/2009 | Bobak et al. | |
| 2009/0249337 A1 | 10/2009 | Vasilevsky et al. | |
| 2010/0280863 A1 | 11/2010 | Wilcock et al. | |
| 2011/0004564 A1 | 1/2011 | Rolia et al. | |

OTHER PUBLICATIONS

Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13 (in Office Action for U.S. Appl. No. 11/965,926—no further date information available.).
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339 (in Office Action for U.S. Appl. No. 11/965,845—no further date information available.).
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developers Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).

Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Office Action for U.S. Appl. No. 11/965,855 dated Apr. 30, 2010.
Final Office Action for U.S. Appl. No. 11/966,495 dated May 14, 2010.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.
"Parasoft BPEL Maestro," http://www.parasoft.com/jsp/products/home.jsp?product=BPEL.
Final Office Action for U.S. Appl. No. 11/965,897 dated Sep. 17, 2010.
"BPEL Project", http://www.eclipse.org/bpel/.
"Factor Analysis Using SAS PROC Factor", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Final Office Action for U.S. Appl. No. 11/965,926 dated Jul. 19, 2011.
Final Office Action for U.S. Appl. No. 11/965,832 dated Jan. 9, 2012.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.

Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Final Office Action for U.S. Appl. No. 11/965,889 dated Jan. 11, 2012.
Office Action for U.S. Appl. No. 11/965,845 dated Apr. 18, 2012.
Office Action for U.S. Appl. No. 11/965,922 dated Apr. 20, 2012.
Crawford, C. H. et al., "Toward an on Demand Service-Oriented Architecture," IBM Systems Journal, vol. 44, No. 1, 2005, pp. 81-107.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).

Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," hftp://www.parasoft.com/jsp/products/home.jsp?product=BPEL, Nov. 6, 2008.
"BPEL Project", http://www.eclipse.org/bpel/, 2008
"Factor Analysis Using SAS PROC Factor", http://www.utexas.edu/cc/docs/stat53.html, Jun. 26, 1995.
"Principal Components and Factor Analysis", http://statsoft.com/textbook/stfacan.html, 2008.
"WebSphere Intergration Developer", retrieved Jul. 3, 2008 http://www-306.ibm.com/software/integration/wid/about/?S_CMP=rnav, retrieved Jul. 3, 2008.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.

* cited by examiner

FIG. 6A

| MESSAGE | RESOURCE | DATE | |
|---|---|---|---|
| ! CONTAINMENT REGION HAS RECOVERED | CONTAINMENT1 | APR 18, 2006 | 10:50:52.193 |
| X CONTAINMENT REGION CREATED FOR RESOURCE FAILURE | CONTAINMENT1 | APR 18, 2006 | 10:50:52.103 |
| ! CONTAINMENT REGION HAS RECOVERED | CONTAINMENT3 | APR 18, 2006 | 10:50:51.982 |
| X DETECTED DYNAMIC MEMBERSHIP CHANGE: ACTIVE POLICY REQU... | RECOVERYSEGMENT2 | APR 18, 2006 | 10:12:25.696 |
| X THIS RESOURCE HAS ENTERED AN UNRECOVERABLE STATE AND RED... | RECOVERY MANAGER2 | APR 18, 2006 | 10:12:25.696 |
| X THIS RESOURCE HAS ENTERED AN UNRECOVERABLE STATE AND RED... | RECOVERY MANAGER1 | APR 18, 2006 | 10:12:14.770 |
| X ACTIVATION OF POLICY XYZ HAS FAILED | RECOVERY SEGMENT1 | APR 18, 2006 | 10:12:14.760 |
| ! DETECTED DYNAMIC MEMBERSHIP CHANGE: ACTIVE POLICY REQD... | RECOVERY SEGMENT2 | APR 18, 2006 | 10:10:25.696 |

THE RESOURCE 'TOWER 1 RECOVERY' HAS ENTERED AN UNRECOVERABLE STATE THAT REQUIRES YOUR INPUT. DO YOU WANT TO OPEN THE RESOURCE NOW?

[YES] [NO]

*650*

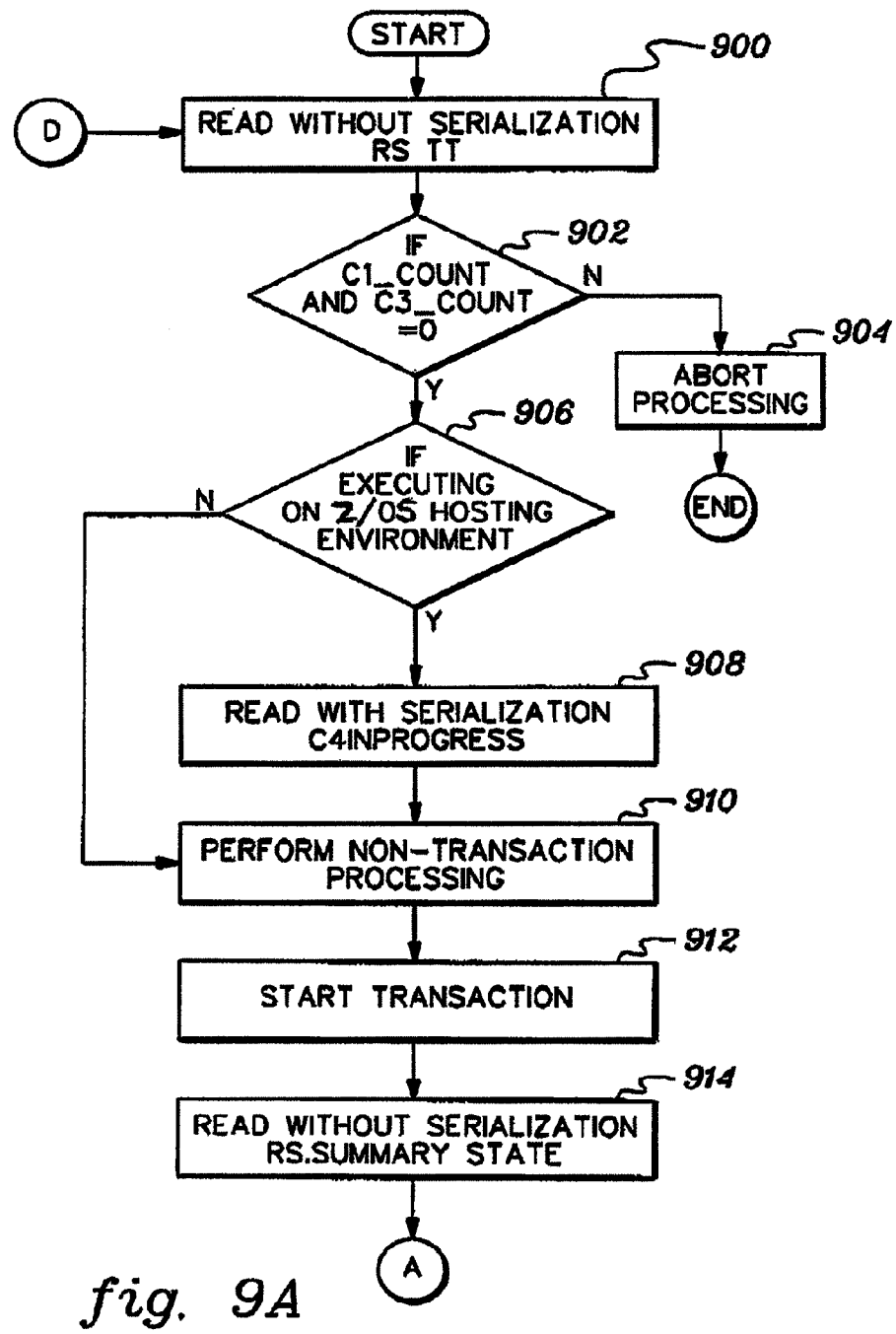

PREVENTING EXECUTION OF PROCESSES RESPONSIVE TO CHANGES IN THE ENVIRONMENT

TECHNICAL FIELD

This invention relates, in general, to managing customer environments to provide support for business resiliency, and in particular, to using serialization to control execution of processes used in managing the environments.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability to facilitate management of an IT environment. In particular, a need exists for a capability that provides serialization to control execution of processes used to manage the environment.

The shortcomings of the prior art are overcome and additional advantages are provided through the provision of a computer-implemented method to manage processing within a computing environment. The method includes, for instance, programmatically providing, without user intervention, a plurality of categories of processes, the plurality of categories having a plurality of priorities associated therewith; and programmatically preventing execution of a process of one category, in response to detecting that a process of another category is executing, wherein the one category is of a lower priority than the another category.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

FIGS. 9A-9D depict one embodiment of the logic to provide a general pattern for processing administrative flows (Category 4), in accordance with an aspect of the present invention;

DETAILED DESCRIPTION OF THE INVENTION

Figure 1:
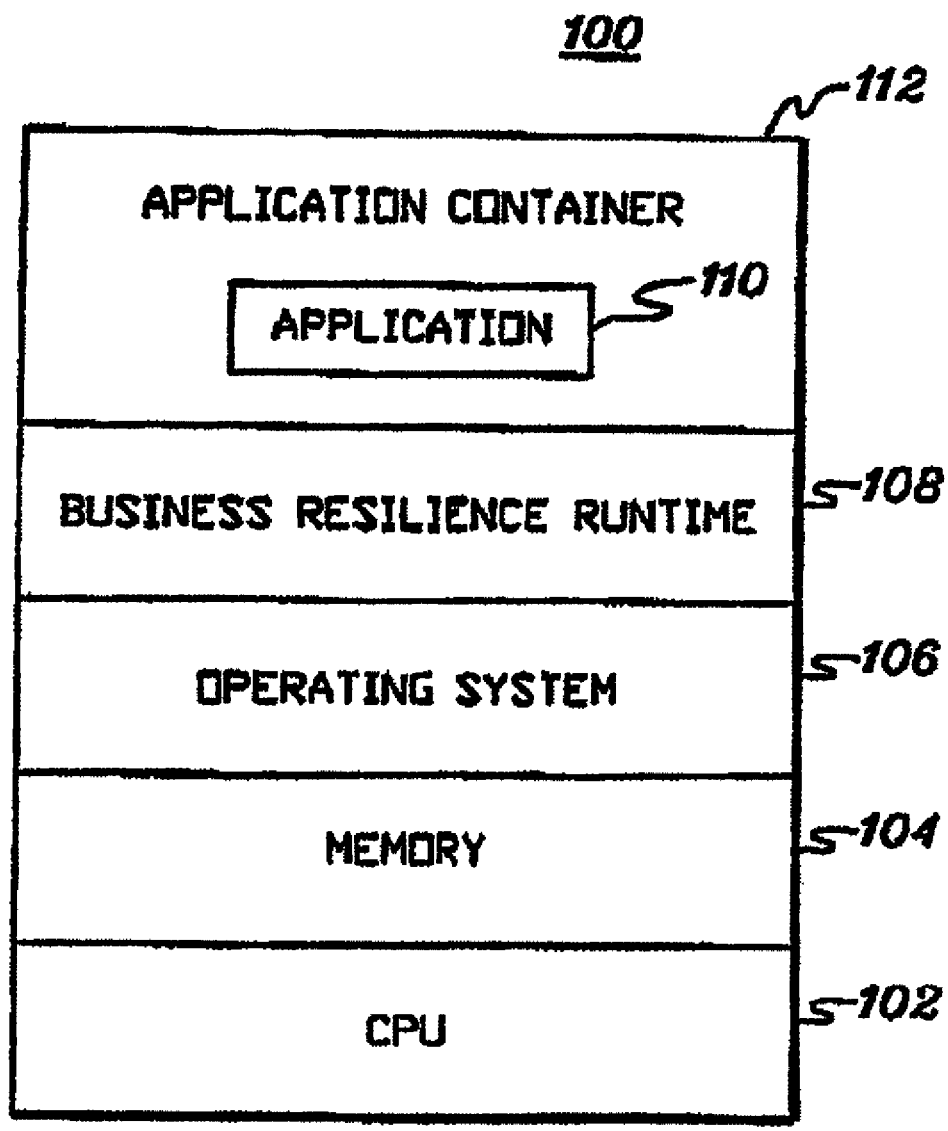
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:
    What is my expected recovery time for a given application during "end of month close" system environment?
    What is the longest component of that recovery time?
    Can I expect to achieve the desired RTO during the "market open" for stock exchange or financial services applications?
    What would be the optimal sequence and parallelization of recovery for the resources used by my business application?
17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?
18. Ability to incorporate operations from any vendors' resources for pre-conditioning or recovery workflows, including specification of which pre-conditioning operations have effect on recoveries, which operations have dependencies on others, either within vendor resources or across resources from multiple vendors.
19. Customer ability to modify pre-conditioning workflows, consistent with supported operations on resources.
20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:
1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.
2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.
3. Integration of availability management with normal business operations and other core business processes.
   Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:
1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.

4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
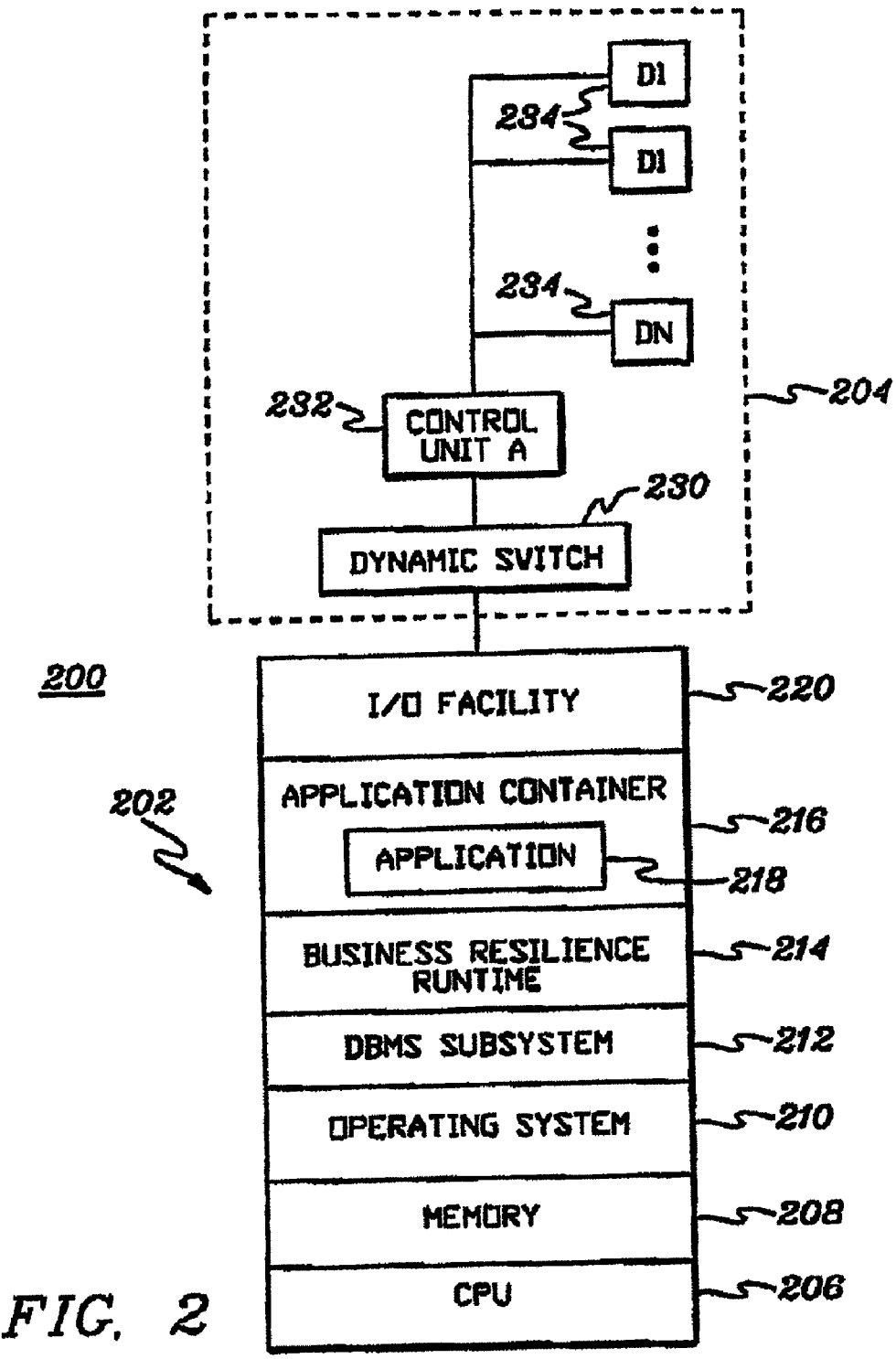
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
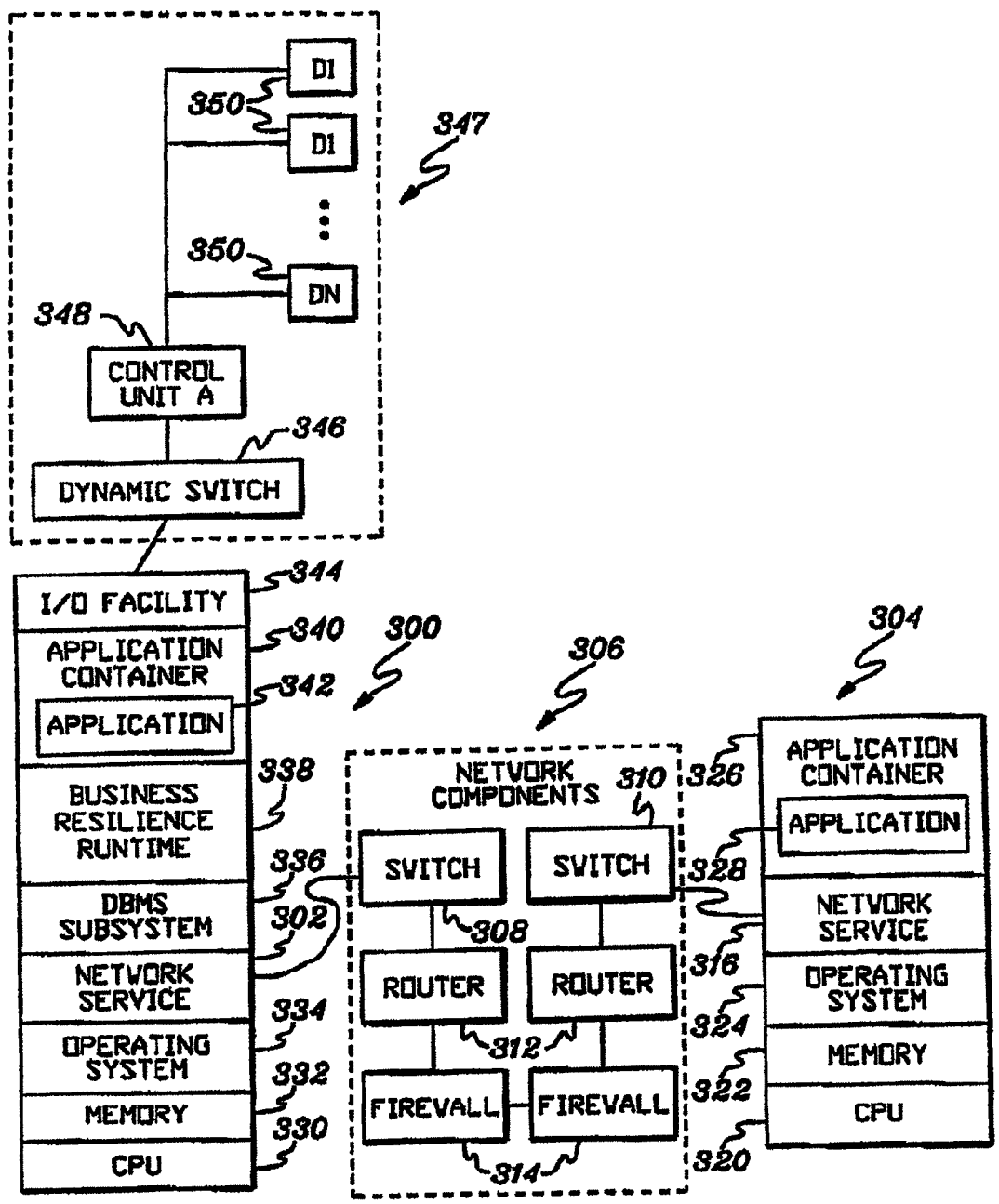
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in-progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
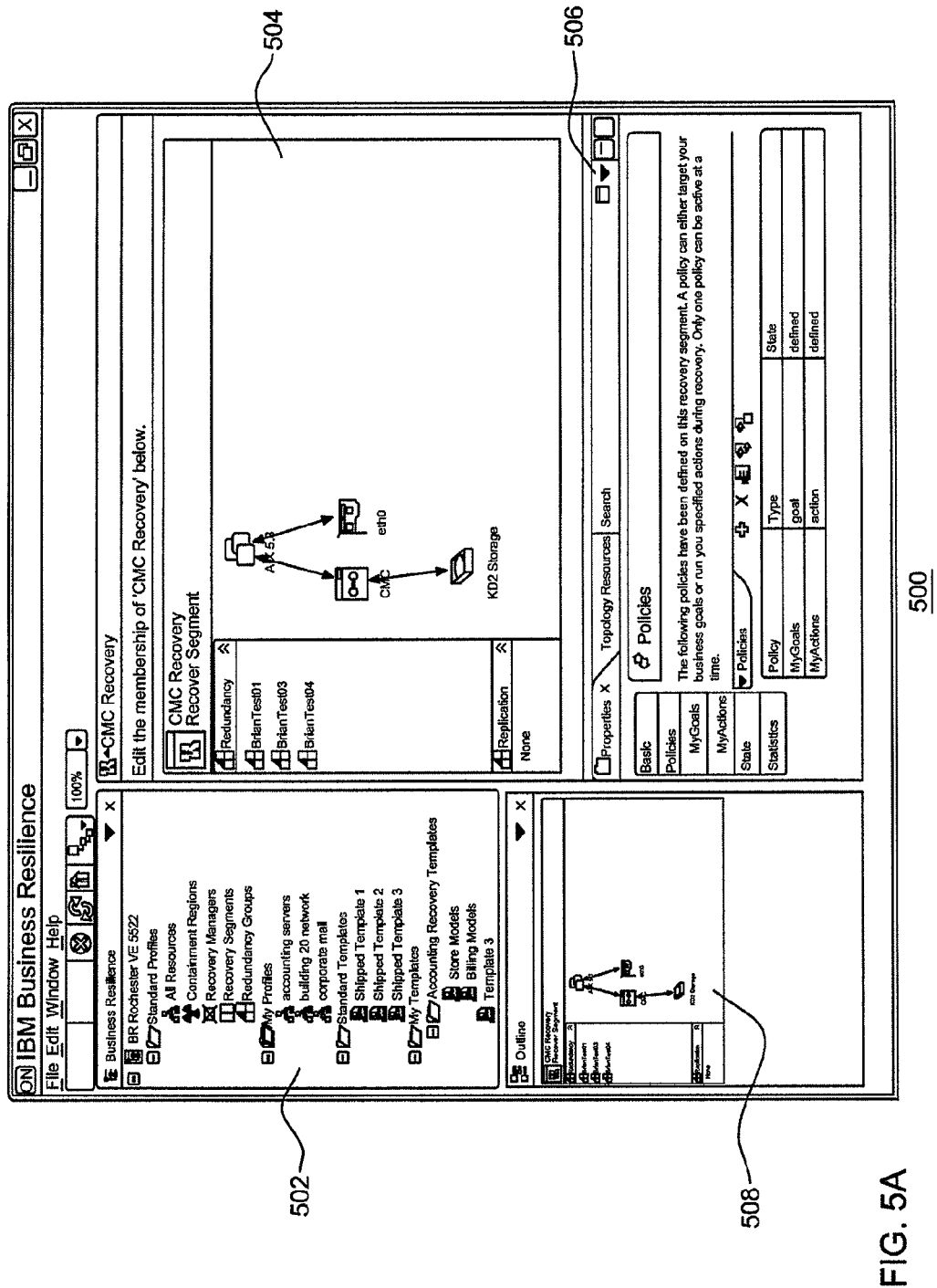
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View 506

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
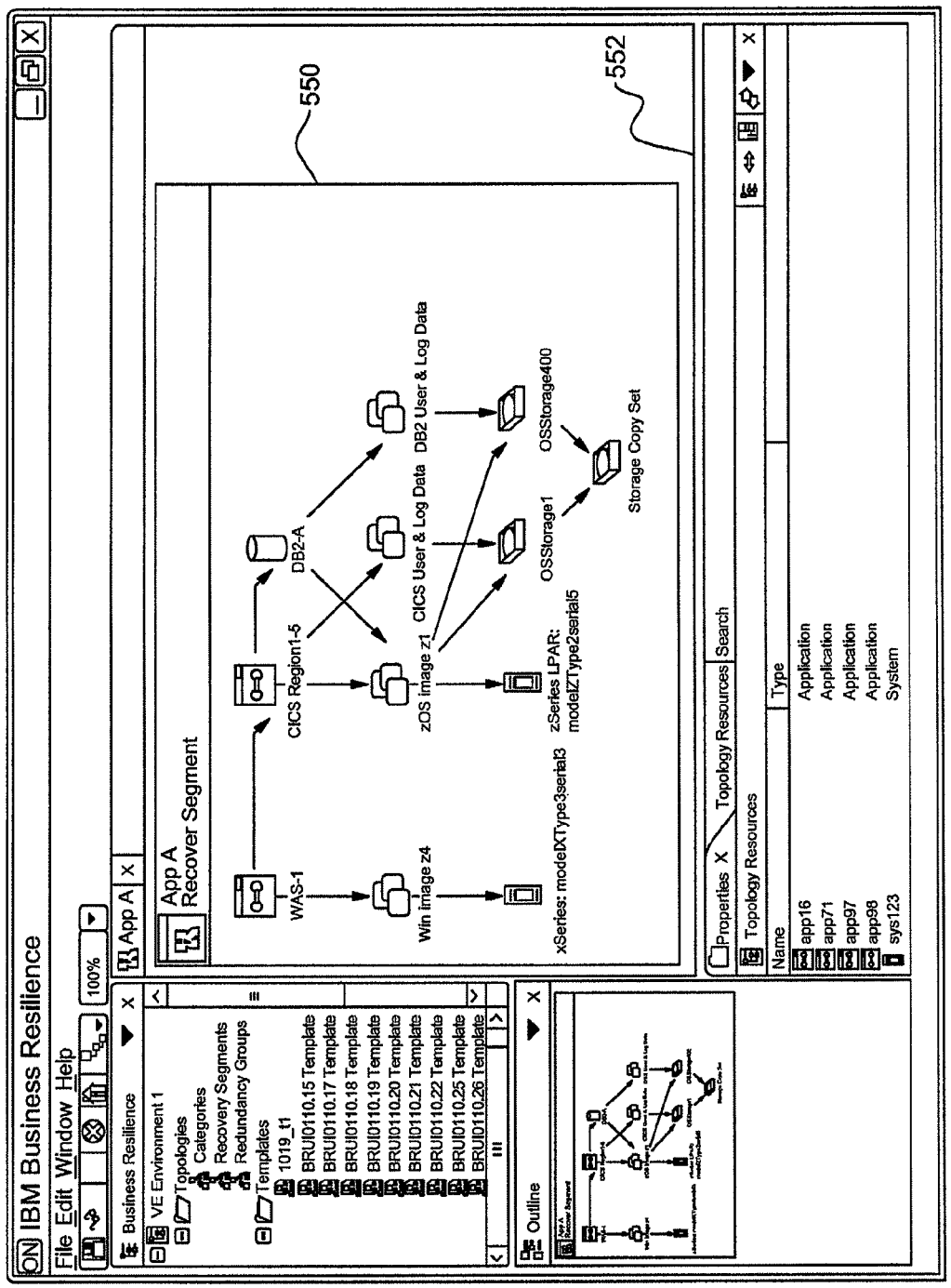
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
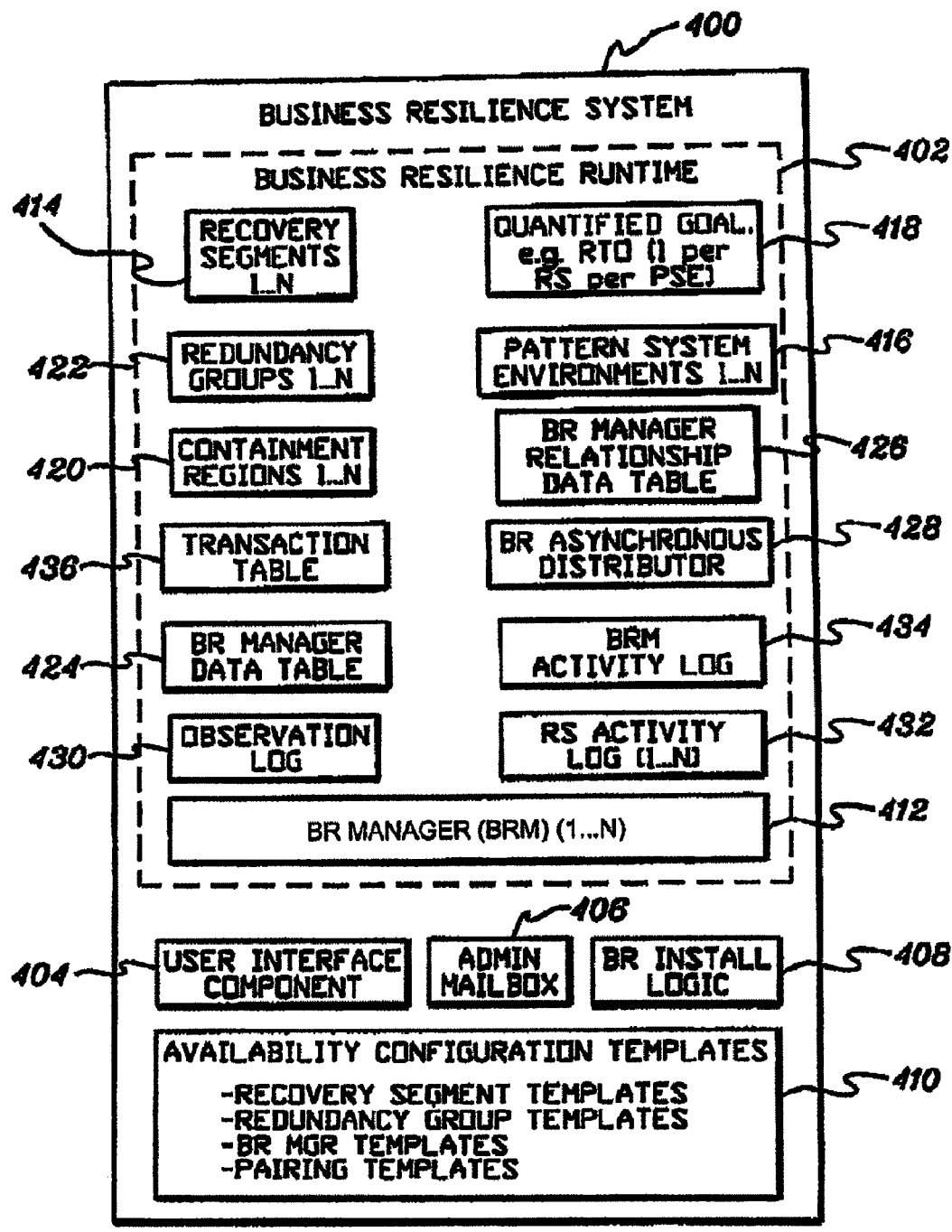
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates
   The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates
   The BR System has a set of Redundancy Group templates which represent common patterns of forming groups of redundant resources. These are optionally selected and pattern matched with each individual customer environment to produce recommendations for RG definitions to a customer.

BR Manager Deployment Templates
   The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates
   The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
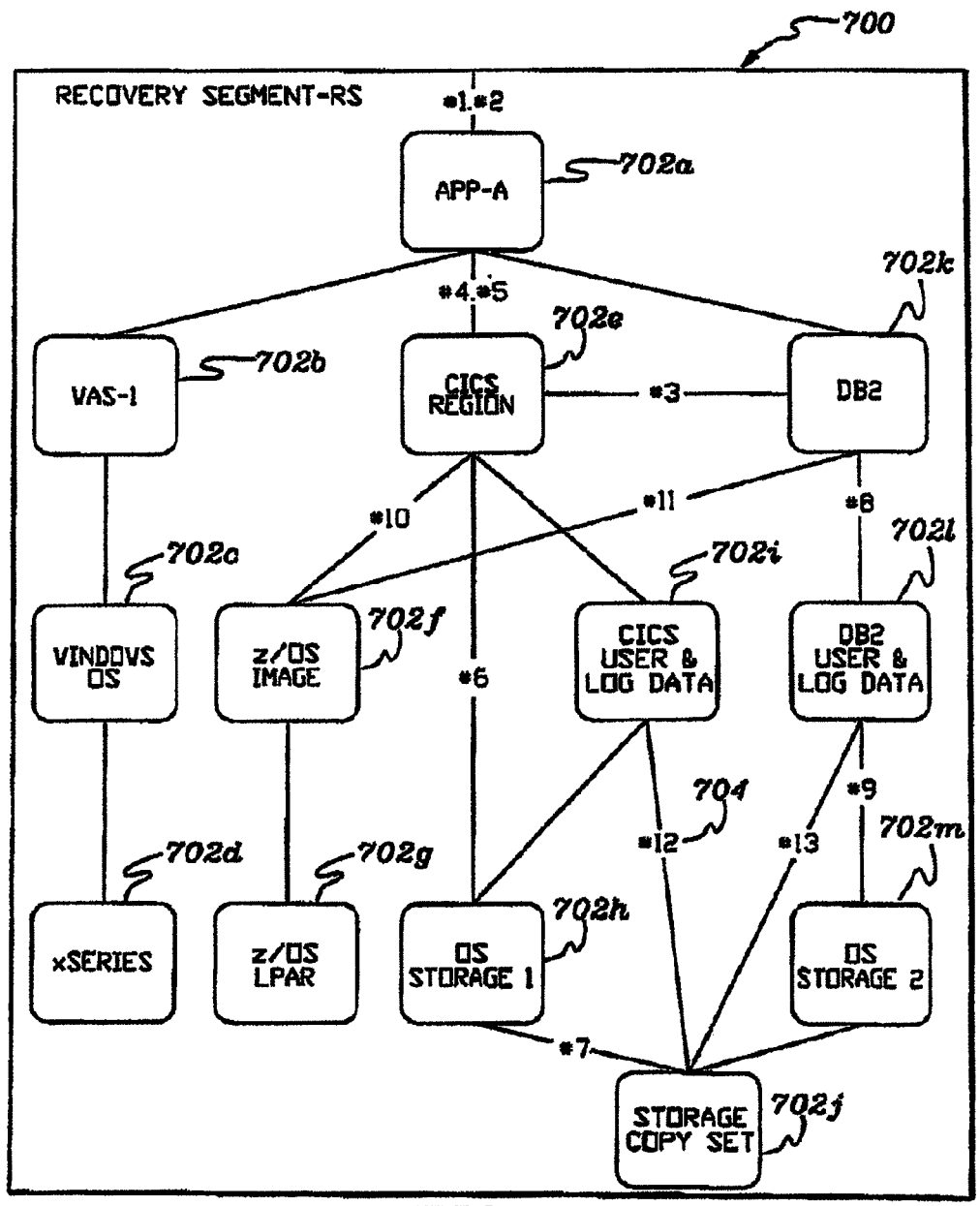
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:
   The Recovery Segment RS has been defined associated with an instantiated and deployed BR Manager for monitoring and management.
   Relationships have been established between the Recovery Segment RS and the constituent resources 702a-702m.
   A goal policy has been defined and validated for the Recovery Segment through interactions with the BR UI.
   The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:
   The BRM has subscribed to runtime state change events for the RS.
   RS has subscribed to state change events for the constituent resources.

These STEPs highlight one example of an error detection process:
   The OSStorage-1 resource 702h fails (goes Unavailable).
   RS gets notified of state change event.

1st level state aggregation determines:
Storage Copy Set→Degraded
CICS User & Log Data→Degraded
DB2 User & Log Data→Degraded
DB2→Degraded
CICS→Unavailable
App-A→Unavailable
1st level state aggregation determines:
RS→Unavailable
BRM gets notified of RS state change. Creates the following Containment Region:

| Resource | Reason |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—STEPs taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—STEPs taken as a result of fault detection during runtime monitoring of the environment, such as, for example, restarting a failed operating system (OS). BR generates recovery workflows dynamically, in one example, based on the actual failure rather than a pre-specified sequence.

Preventive—STEPs taken to contain or fence an error condition and prevent the situation from escalating to a more substantial outage or impact; for example, the severing of a failed resource's relationship instances to other resources. Preventive workflows are also dynamically generated, in one example.

Return—STEPs taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

"WebSphere Integration Developer" at IBM.com

"BPEL Project" at eclipse.com

"Parasoft BPEL Maestro" at parasoft.com

Tooling Lifecycle, Support of Managed Resources and Roles

BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo"

workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
  RS definition from representation of IT Resources;
  Goal (RTO) and action policy specification, validation and activation; and
  Tooling by Eclipse, as an example, to integrate with IT process management.
Rapid, flexible, administrative level:
  Alteration of operation escalation rules;
  Customization of workflows for preparatory and recovery to customer goals;
  Customization of IT resource selection from RG based on quality of service (QoS);
  Alteration of definition of IT resource and business application state (available, degraded, or unavailable);
  Customization of aggregated state;
  Modification of topology for RS and RG definition;
  Selection of BR deployment configuration;
  Alteration of IT resource recovery metrics;
  Customization of generated Pattern System Environments; and
  Specification of statistical tolerances required for system environment formation or recovery metric usage.
Extensible framework for customer and vendor resources:
  IT resource definitions not specific to BR System; and
  Industry standard specification of workflows, using, for instance, BPEL standards.
Adaptive to configuration changes and optimization:
  IT resource lifecycle and relationships dynamically maintained;
  System event infrastructure utilized for linkage of IT resource and BR management;
  IT resource recovery metrics identified and collected;
  IT resource recovery metrics used in forming Pattern System Environments;
  Learned recovery process effectiveness applied to successive recovery events;
  System provided measurement of eventing infrastructure timing;
  Dynamic formation of time intervals for aggregation of related availability events to a root cause; and
  Distribution of achieved recovery time over constituent resources.
Incremental adoption and coexistence with other availability offerings:
  Potential conflict of multiple managers for a resource based on IT representation;
  Workflows for recovery and preparatory reflect operations with meta data linked to existing operations;
  Advisory mode execution for preparatory and recovery workflows; and
  Incremental inclusion of resources of multiple types.
Support for resource sharing:
  Overlapping and contained RS;
  Merger of CR across RS and escalation of failure scope; and
  and recovery workflows built to stringency requirements over multiple RS.
Extensible formalization of best practices based on industry standards:
  Templates and patterns for RS and RG definition;
  Preparatory and recovery workflows (e.g., BPEL) for customization, adoption; and
  Industry standard workflow specifications enabling integration across customer and multiple vendors.
Integration of business resilience with normal runtime operations and IT process automation:
  Option to base on IT system wide, open industry standard representation of resources;
  BR infrastructure used for localized recovery within a system, cluster and across sites; and
  Utilization of common system infrastructure for events, resource discovery, workflow processing, visualization.

Management of the IT environment is adaptively performed, as described herein and in a U.S. patent application "Adaptive Business Resiliency Computer System for Information Technology Environments," (POU920070364US1), U.S. Ser. No. 11/966,495, Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. patent applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), U.S. Ser. No. 11/965,855, Bobak et al., which is hereby incorporated herein by reference in its entirety.

Definition of a RS may use a representation of resources in a topology graph as described in "Use of Graphs in Managing Computing Environments," (POU920070112US1), U.S. Ser. No. 11/965,906, Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), U.S. Ser. No. 11/965,877, Bobak et al., which is hereby incorporated herein by reference in its entirety.

Specification of the availability state for individual resources, redundancy groups and Recovery Segments may be performed as described in "Use of Multi-Level State Assessment in Computer Business Environments,"

(POU920070114US1), U.S. Ser. No. 11/965,832, Bobak et al., which is hereby incorporated herein by reference in its entirety.

Representations for the IT environment in which BR is to operate may be created from historical information captured during observation mode, as described in "Computer Pattern System Environment Supporting Business Resiliency," (POU920070107US1), U.S. Ser. No. 11/965,851, Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), U.S. Ser. No. 11/965,874, Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111US1), U.S. Ser. No. 11/966,619, Bobak et al., which is hereby incorporated herein by reference in its entirety.

Managing the IT environment to meet availability goals includes having the BR system prioritize internal operations. The mechanism utilized to achieve the prioritization is described herein, in accordance with one or more aspects of the present invention.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (POU920070123US1), U.S. Ser. No. 11/965,894, Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), U.S. Ser. No. 11/965,951, Bobak et al. which is hereby incorporated herein by reference in its entirety.

Management by BR to achieve availability goals may be initiated, which may initiate or continue monitoring of resources to detect changes in their operational state, as described in "Real-Time Information Technology Environments," (POU920070120US1), U.S. Ser. No. 11/965,930, Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), U.S. Ser. No. 11/965,838, Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), U.S. Ser. No. 11/965,902, Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121US1), U.S. Ser. No. 11/965,917, Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), U.S. Ser. No. 11/965, 862, Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), U.S. Ser. No. 11/965,913, Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), U.S. Ser. No. 11/965,897, Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:
- Coordination for administrative task that employ multiple steps, as described in "Adaptive Computer Sequencing of Actions," (POU920070106US1), U.S. Ser. No. 11/965,899, Bobak et al., which is hereby incorporated herein by reference in its entirety.
- Use of provided templates representing best practices in defining the BR system, as described in "Defining and Using Templates in Configuring Information Technology Environments," (POU920070109US1), U.S. Ser. No. 11/965,845, Bobak et al., which is hereby incorporated herein by reference in its entirety.
- Use of provided templates in formulation of workflows, as described in "Using Templates in a Computing Environment," (POU920070126US1), U.S. Ser. No. 11/965, 922, Bobak et al., which is hereby incorporated herein by reference in its entirety.

Making changes to the availability goals while supporting ongoing BR operation, as described in "Non-Disruptively Changing a Computing Environment," (POU920070122US1), U.S. Ser. No. 11/965,926, Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," (POU920070125US1), U.S. Ser. No. 11/965,889, Bobak et al., which is hereby incorporated herein by reference in its entirety.

Detecting and recovery for the BR system is performed non-disruptively, as described in "Managing Processing of a Computing Environment During Failures of the Environment," (POU920070365US1), U.S. Ser. No. 11/965,872, Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |

-continued

| Resource Type | Property | Value Range |
|---|---|---|
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active | Complex |

-continued

| Resource Type | Property | Value Range |
|---|---|---|
| | Network OS services State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |

-continued

| Resource Type | Property | Value Range |
|---|---|---|
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in-progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in-progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
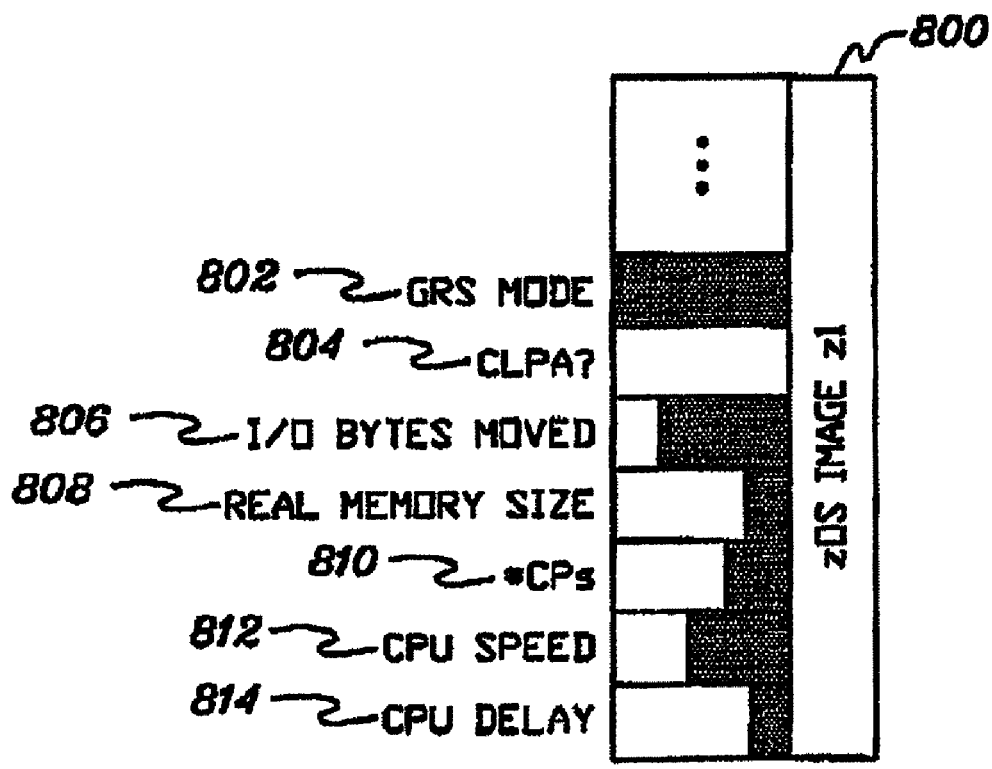
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
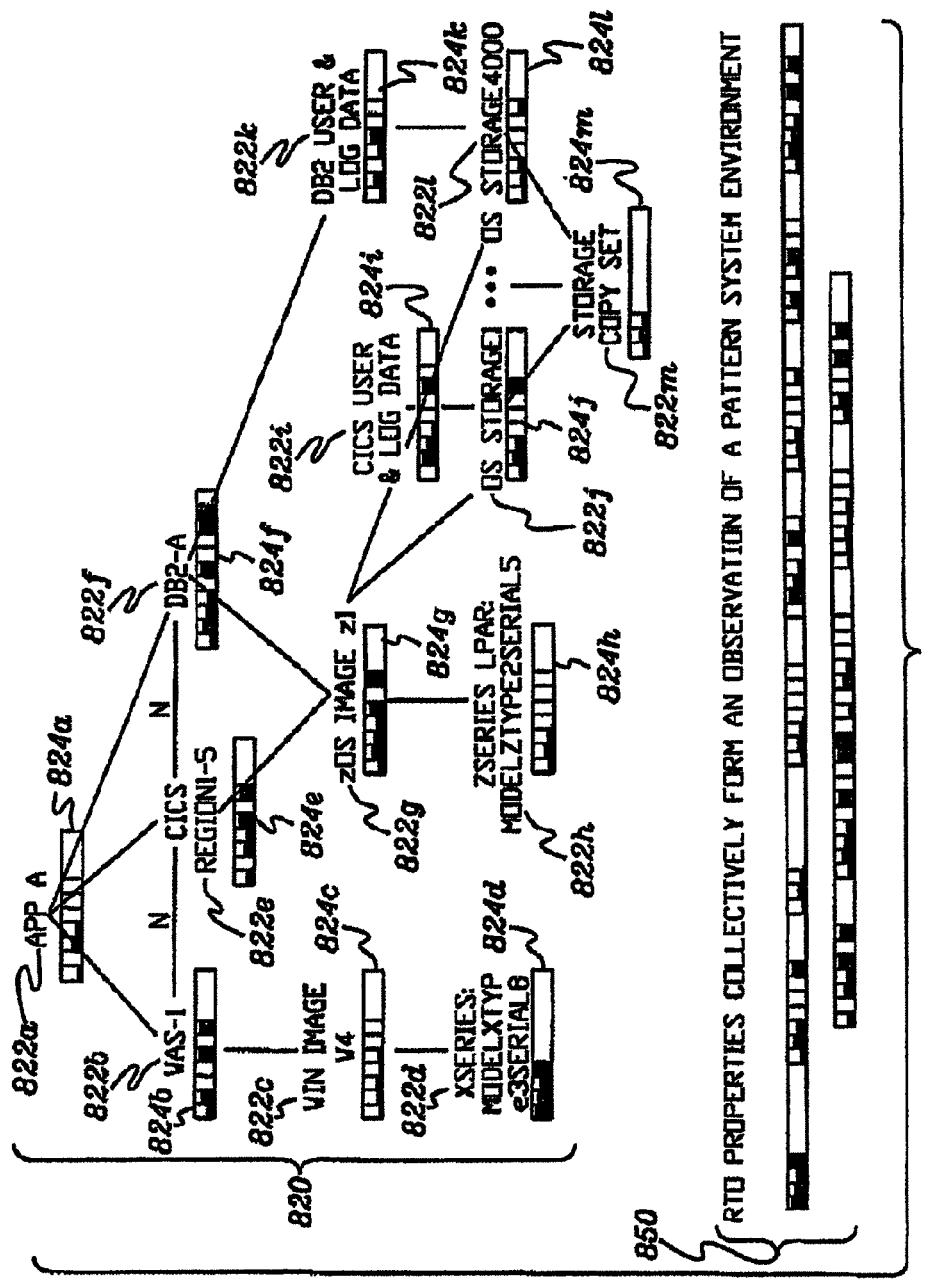
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

There is also a set of information about the resource that is employed—this information is provided as defaults in the BRMD entry for the resource, but provided to the BR team in the form of best practices information/defaults by the domain owners:

The operational state of the resource at which the observed recovery time interval started.

The operational state of the resource at which the observed recovery time interval ended.

The operational states of the resource at which point it can unblock dependent resources (example: operational states at which a DB2 could unblock new work from CICS, at which it could allow processing of logs for transactions ongoing at time of failure . . . ).

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.

Are present to understand impacts on managed resources.

No decomposed RTO is associated with an assessed resource.

They are resources on which resources managed by BR depend upon, but are not directly acted on for availability by BR.

They are resources removed (or not explicitly added) from the actively monitored set of resources by the BR admin during RS definition.

They are resources that BR does not try to recover and BR thus will not invoke any preparatory or recovery operations on them.

| Metric | Qualification |
|---|---|
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from z/OS ® WLM for an aggregation of processes/address spaces over a given interval. |

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.

The RS subscribes to state change notifications for assessed resources (and possibly other notifiable properties).

Relationships between observed and managed resources are possible (and likely).

BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, management of an environment is facilitated by providing a serialization technique that controls execution of processes used to manage the environment. In one implementation, the processes are programmatically categorized into a plurality of categories, each category having a priority associated therewith. Serialization is then used to control which processes of which categories are executed first, which can be executed concurrently, etc.

Considerations

In managing an IT environment and the resources related to a set of business applications, there is a need for the various management disciplines to differentiate among the priority of processes that are handled by the management components themselves. For example, it may well be desirable to have administrative tasks deferred during critical performance or recovery processing. One or more aspects of the present invention are usable by various disciplines of IT management, and in particular, to categorize and prioritize processing across various disciplines. In the example implementation described herein, a Business Resilience System is detailed that utilizes one or more aspects of the present invention to differentiate levels of processing within an availability management discipline. However, this is only one example.

Business Resilience as a goal oriented, runtime management discipline anticipates providing the highest availability for execution of monitoring and recovery processes, as it is responsible for maintaining the ongoing operation of customer IT supported business functions. Runtime management for availability, monitoring resource status, preparing the environment to meet recovery goals and administrative activities to alter the goal based configuration for BR are to operate on a consistent set of data. Obtaining consistency in the data, while insuring certain processes, such as critical processes for recovery of the environment and monitoring of the environment, execute in preference to lower priority processes, such as preparing the environment or supporting administrative changes, is provided in one aspect of the present invention. In one implementation, the BR logic may execute within web services containers, utilize the transactional semantics supported by web services, use the transactional characteristics of the database systems used for persistence of BR data, and provide the techniques to insure the highest availability for critical BR functions. Traditionally, much simpler techniques involving strict serialization protocols do not achieve the differentiated level of process priority, do not facilitate termination of non-critical processes in favor of critical processes, and do not minimize serialization time over required data.

More traditional alternatives which were explored include:

Insert only:
Use database INSERT for all database updates. Use the DB2® "skip uncommitted insert" read option, which would require BR to implement management of the database records inserted and would require DB2® "read last committed" support. This option is less desirable because of complexity in BR management of DB2® inserted records and dependency on SQL function in latest DB2® versions, which is also not part of the existing SQL standard.

Optimistic Locking:
Use optimistic locking and BR logic on all accesses to resource database records. This would require BR logic to use "row change timestamp/token" and implement a locking protocol within BR based on DB rows as serialization point. This option is less desirable as it has significant complexity in BR logic design to build a lock manager using optimistic locking and the optimistic locking support is only in certain versions of DB2®, is not in UDB and is not a SQL standard.

BR Exclusive Lock Manager:
Build a BR lock manager with distributed locking protocols supported through message passing, a centralized lock manager, locking components for each BR manager environment, recovery for centralized lock manager, BR specific locking rules for compatibility and sequencing of blocking requests for locks. This is less desirable due to significant cost and complexity in design.

Two Copies of Resource Data Instances:
Build the BR resource instance implementations using two rows with administrative updates going to one row and runtime access using the second row. Switch rows on BR administrator operations to make changes active in the current runtime. This would require BR to divide all properties and state for all BR resources into two categories: one that can be updated in runtime and a second category that can be updated in BR administration time. Switching between the two copies becomes BR logic responsibility with BR logic also required to merge administration time changes into the runtime environment. This option is also less desirable due to complexity and cost.

BR System Serialization Overview

In accordance with an aspect of the present invention, BR supports concurrent flows in its management, both from the perspective of administration changes, as well as runtime availability event handling. As a result, this design categorizes each flow within BR into the following categories, as examples:

Category1=Highly critical operations; in one management discipline, recovery related operations.

Category2=Monitoring of the environment.

Category3=Preparatory type actions in support of activating a policy.

Category4=Administrative operations, such as changing settings, altering policy.

There are prioritizations within these categories, roughly described by the number designations. For example, Category 1 has a priority of 1, which is the highest priority in this example; Category 2 has a priority of 2; Category 3 has a priority of 3; and Category 4 has a priority of 4, which is the lowest priority in this example.

Category 1 and 3 type flows can terminate ongoing Category 4 flows, and prevent new ones from forming. Category 4 flows can be long running, and so periodically enable interruption during processing to allow for termination if a recovery situation is underway.

Capabilities provided by BR are described as flows which have an effect on the IT environment, are initiated by some person performing some role or triggered by some event and which have a set of data objects that are referenced, updated or caused to materialize or dematerialize. Each of the possible BR flows fall into one of, for instance, four broad categories which are generally a reflection of importance or urgency. The four categories of flows update a common set of BR related resources (also referred to as data objects) (RS, BRM, CR, BRMD, BRRD, etc.) As a result, serialization protocols are defined to minimize conflicts and to ensure operation with a desired priority. Associated with each category there exists a serialization protocol which is followed. The serialization protocols are achieved through use of a combination of techniques, including for example, use of transaction scope, database serialization which is blocking, database serialization which is non-blocking, fields which represent a summary of change to the environment under which workflows were built, and protocols for ordering of operations to minimize the duration of time over which serialized access to objects is required. The objective of the serialization protocols is to maximize the potential for critical recovery processes to execute, insure monitoring of the environment is enabled for execution, provide priority for preparatory workflows and enable administrative flows which are of the lowest criticality to execute with the highest degree of concurrency. The four categories of flows include, for instance:

Category 1: Critical processes, including those related to recovery, such as formation of Containment Regions, building of recovery workflows, execution of recovery workflows, monitoring of recovery workflows and other flows directly associated with these functions, as examples.

Category 2: Monitoring processes to detect changes in the environment which require evaluation and potential initiation of recovery processing.

Category 3: Alterations to the environment via submission of preparatory workflows, monitoring of preparatory workflows, and flows related to this function.

Category 4: Flows which involve administrative definition and activation of change to the environment through administrative definitions. This is the largest single category and includes flows for policy definition and change, flows for Recovery Segment definition and change, flows for altering metadata associated with resources and the flows for taking those definitions and making them current in the runtime environment, as examples.

Processing to Use Transaction Scope

Most of the flows establish the start and end of a transaction or execute within an established transactional scope. The Web services runtime environment provides services for starting a transaction, committing a transaction, aborting a transaction and rolling back the changes made within a transaction scope. Web services support execution using a transactional context that is inherited from the caller or if no transactional context exists, establishing a transaction for the operation which enables the service to either complete with the described behavior or terminate in error with no intermediate changes made observable. Each operation on every resource provides the same transactional semantics as Web services. As known, a Web service is a software system designed to support interoperable machine to machine interaction over a network. Web services are frequently Web APIs that can be accessed over a network, such as the Internet, and executed on a remote system hosting the requested services.

Shared Resources and Configuration Change

The BR environment is designed to support sharing of resources between business applications, and therefore, between Recovery Segments. A resource can be shared between Recovery Segments. A Recovery Segment can be a subset of another Recovery Segment. Further, a Recovery Segment can be shared as a subset Recovery Segment between two or more Recovery Segments. For all of these environments, any change which causes the summary state at a RS level to change is also to cause the summary state of all other sharing RS(s) to be changed. Specifically:

When a shared resource is changed such that the RS summary state is updated, the sharing RS(s) summary state is to be updated.

When a subset RS summary state is changed, the superset RS summary state is to be changed.

When a shared RS is changed, the sharing superset RS(s) summary state(s) is to be changed.

When a superset RS is changed, the subset RS(s) summary state(s) is to be changed.

Administrative Flow Management

In this implementation, execution of Category 1 flows is to be enabled to the greatest extent possible. Furthermore, execution of Category 3 flows are not to be compromised by Category 4 flows. Category 2 flows execute at all times and are at no time blocked by any other category of flow. Category 4 flows do alter the current runtime environment—the same environment being recovered by Category 1 flows or altered by preparatory actions of Category 3 flows. However, the Category 4 flows should not block execution of more critical recovery flows and preparatory flows. Two considerations are addressed to insure Category 4 flows do not block execution of more critical flows. New Category 4 flows are blocked from starting execution if more critical flows are in-progress and Category 4 flows which are in-progress when a Category 1 or Category 3 flow starts terminate at the earliest possible time.

New Category 4 flows are blocked for execution by checking for Category 1 and Category 3 flows in process. Associated with the Recovery Segment a database record with a primary key of "Recovery Segment Transaction Table" (RS TT) is maintained. At the beginning of each Category 1 and Category 3 flows, the RS TT record is read with cursor stability (Read CS), which returns the database record and serializes access from other SQL requests. A count of currently in-progress Category 1 and Category 3 flows in the RS TT record is incremented at the start of Category 1 and Category 3 flows and decremented at the end of Category 1 and Category 3 flows. Category 4 flows "dirty read" (read without cursor stability (CS), which returns the database record and does not serialize access from other SQL requests) the RS TT record at the beginning of the flow. If the count of in-progress Category 1 and Category 3 operations is not zero, the Category 4 flow ends before making any alterations to the environment. Notification is provided by a programmatic return code, and if the Category 4 flow was initiated from the BR, administrative UI notification of in-progress recovery or preparatory workflows is returned.

Category 4 flows which are in-progress at the time a Category 1 or Category 3 flow begins execution are terminated at the earliest possible point in time. Category 4 flows are structured to follow a pattern of, for instance:

Read without being blocked ("dirty read") the RS TT and RS current state to determine if continued execution is allowed (i.e. no Category 1 or Category 3 in-progress).

Establish a transactional context, if needed.

Perform operations which do not obtain database locks utilizing the transactional context.

During execution of operations, periodically check by "dirty read" of the RS TT to determine if a Category 1 or Category 3 operation has been started and abort if a Category 1 or Category 3 operation started after the Category 4 flow started. The steps of determining if a Category 1 or Category 3 flow has begun while the Category 4 flow is in execution with termination of the Category 4 flow should a Category 1 or Category 3 flow be detected is termed "open window". This is particularly true for Category 4 operations that run for extensive time periods.

Read with cursor stability the RS TT before updating any other database record (Read CS the RS TT) and recheck the RS TT fields indicating Category 1 or Category 3 operations are in-progress. Also revalidate that the RS is currently in both a BR administrative state and an operational state consistent with the function of the Category 4 flow.

Execute any required database record updates as compactly as possible; this set of updates is to be kept minimal, compact, and close to commit so as to minimize any serialization on the RS TT and other BR resources.

Commit or abort the transaction with minimal processing from the point of the blocking read of the RS TT to commit/abort.

This pattern for Category 4 flows minimizes the likelihood of blocking a Category 1 or Category 3 flow. There are intervals where updates made by a Category 4 flow could be blocking a Category 1 or Category 3 flow. Several alternatives for eliminating this interval or for further minimizing this interval are documented later.

Category 4 flows may require long running sequences of operations. For example, when a RS is defined, many relationships may be established among resource(s) and the RS; or when a RS becomes actively monitored by BR for achievement of a policy, many subscriptions may be established for event notification. The flows which require potentially long running operations are performed using the pattern described herein. The long running part of the flow is within a transaction, does not have referenced resources resulting in database locks being held that would block Category 1 or Category 3 flows (i.e., will use dirty read during long running part of the flow), and periodically "opens window" to detect the start of a Category 1 or Category 3 flow. If the start of a Category 1 or Category 3 flow is detected in "open window", the flow aborts to enable timely execution of the higher priority flow.

Category 4 flows that do not invoke long running operations may also "open window" to enable intervention of higher priority Category 1 or Category 3 flows. If a Category 4 flow could be included in a programmatic process or a workflow that would cause repeated, long running execution in a nested transaction for batch update to the BR environment, the Category 4 flow "opens window" to enable the timely execution of the higher priority flows. When the <PreventNew> sequence is invoked at the beginning of each Category 4 flow, a check is made for Category 1 or Category 3 flows in-progress.

Administrative Flow Termination

In the z/OS® environment, as an example, it is possible to explicitly and programmatically terminate processes that hold database locks. This capability is enabled and utilized by BR to terminate any Category 4 flows that may be blocking recovery or preparatory workflow flows. In the z/OS® environment, the processing to check for in-progress Category 1 or Category 3 flows also reads with cursor stability a well known database record—C4INPROGRESS. In a z/OS® environment, the processing at the start of Category 1 and Category 3 flows invokes asynchronous processing to determine processing holding a lock on C4INPROGRESS and terminate those processes through the use of the DB2® for z/OS® Instrumentation Facility Interfaces.

Order of Locking

Category 4 flows generally run concurrently. There is no assumption of a single BR administrator. In order to avoid deadlocks in concurrently running Category 4 transactions, a recommended ordering to gaining serialized access to objects is followed by the transactions. The following example order obtains serialization of fine grain objects before obtaining serialization on more coarse grain objects. Coarse grain objects are fewer in number and when serialized block execution of a larger number of potentially concurrent processes than fine grain objects. The ordering for obtaining serialization of BR resources follows from first serialized to last serialized, and is as follows, in one example:

BRMD entry
RS Activity Log
RS Observation Log
BRRD entry
RGTAB entry
RS
PSETAB entry
CRTAB entry
BRM
BRM Activity Log Invalidation of Workflows on Configuration Change A characteristic of many of the BR flows is the creation, execution and monitoring of workflows (or processes) to prepare the environment to meet recovery time objectives or recover within specified recovery time objectives. Workflows are created for other BR processes including delta changes to a prepared environment or undoing changes resulting from a failure to prepare the environment. When a workflow is created, there exists a configuration of resources. The created workflow has validity and meaning within the context of that configuration and can be thought of as having a latent bind to that configuration. That configuration of resources can be altered through the execution of a recovery workflow, execution of a preparatory workflow or through changes initiated by the BR administrator. BR administrator changes include, for example, adding or removing resources to a Recovery Segment, altering the goal policy associated with a Recovery Segment, altering the ordering or operations to be performed, or causing a preparatory workflow to be executed. Since there exists a latent bind between a workflow and the configuration in existence at the time that workflow was built, BR maintains a summary state at the Recovery Segment level reflecting the current configuration. Updates to the configuration that would invalidate workflows built in the context of that configuration cause the summary state of the RS to be altered. When a workflow is built and saved for execution at a later time (as are preparatory workflows, for example), the current configuration summary state is captured and saved. Flows that utilize saved workflows insure that the environment current at the time of their execution is the same as the environment current at the time the workflows were created by comparing the current summary state with the summary state saved with the workflow.

There exists a set of changes to resource metadata which could be considered to either alter the configuration or not alter the configuration. Examples of such changes include altering the preparatory operation ordering, altering the escalation rules associated with operations in a category, altering the operation dependency information between instances of resources, and altering the dependency information for failure and degraded operation relationships. The flows for each of these changes explicitly state whether or not the summary state at the RS is updated to break latent binds to workflows generated assuming a configuration context. If the latent bind is broken due to a change in the environment between time of create and time of use, the workflow needs to be regenerated in the context of the current environment.

Flows which have dependencies on detecting changes in the configuration to break latent binds between constructed workflows and changes to the configuration the workflow was built for follow a consistent pattern, in one example. A first check, under a transaction, is made using "dirty read" of the RS summary state. If the RS summary state has changed from the time the workflow was created up to the time the flow using the workflow executes, the transaction is aborted. After performing operations that do not block database access (under the transactional context), the RS is accessed with serialization. Holding serialization on the RS, the RS summary state is rechecked to insure it continues to be the same as that saved with the workflow. If a change to the configuration has occurred, the transaction is aborted. Otherwise, the flow using the workflow executes and commits.

Monitoring Flows

Monitoring of the BR environment is performed by Category 2 flows, as an example. These flows operate without blocking any other category of flow and without being blocked by any other category of flow. Required data objects retrieved in support of monitoring flows are read without obtaining serialization. Therefore, Category 2 flows run at all times and are concurrent with all other categories of flows.

Preparatory Flow Serialization Processing

Category 3 flows update the RS TT to indicate their presence. This blocks the start of new Category 4 flows and insures timely termination of Category 4 flows in-progress. Category 3 flows do not decrement the count of in-progress Category 3 flows until the complete Category 3 sequence of flows has completed successfully or aborted. If a Category 3 flow terminates abnormally, an attempt is made to reestablish the environment that existed before execution of the preparatory workflow. An undo workflow is built to reestablish the previous configuration. If the undo workflow fails to complete successfully, the BR administrator is notified and takes corrective action. If the undo workflow completes successfully, the RS TT is updated to reflect one less Category 3 flow in-progress. If the BR administrator intervenes to correct the environment, the count of active Category 3 flows is not decremented until the BR administrator specifically indicates corrective actions have been completed and authorizes the count of Category 3 flows to be decremented.

Recovery Flows Terminate Preparatory Workflows

Preparatory workflows execute as part of Category 3 processing, in this example. BR uses knowledge of operation execution duration for workflows and includes invocation of BR supplied operations to detect workflow operation begin and end times. As part of the operations that perform workflow operation timings, a check is made for in-progress Category 1 flows. If a Category 1 flow has begun during execution of the preparatory workflow for Category 3, the workflow is terminated to enable timely execution of the higher priority Category 1 recovery process. On early termination of the preparatory workflow, an undo workflow is built, but not submitted for execution. The undo workflow is saved with the associated RS and notification is provided to the BR administrator. Execution of the undo workflow should be delayed until the recovery processing in-progress has completed. The count of Category 3 processes in-progress remains incremented and blocks further execution of Category 4 flows. When the undo workflow is executed successfully, the count of Category 3 processes is decremented. An interface is also provided to the BR administrator to reset the count of Category 1 and Category 3 processes when recovery has been accomplished outside of BR initiated processing.

When a Category 1 recovery process begins, a count in the RS TT is incremented to block initiation of other non-Category 1 flows. If a Category 3 flow is in-progress, the start of the Category 1 flow attempts to terminate the Category 3 flow either before the workflow is started or by terminating the workflow. The incremented Category 1 in-progress count in the RS TT is examined during workflow operation timing operations provided by BR to end the workflow at operation boundaries.

Recovery Flows are Concurrent and Block Administrative Flows

At the start of a Category 1 flow, the count of in-progress Category 1 flows is incremented in the RS TT. Multiple, concurrent Category 1 flows may be in execution for a RS. Category 1 flows which initiate a new Containment Region (CR) increment the RS TT count of in-progress Category 1 flows. Category 1 flows which terminate a Containment Region decrement the RS TT count of in-progress Category 1 operations. Intermediate processing of a recovery operation causes Category 1 flows to execute, which neither increment or decrement the RS TT count of in-progress Category 1 flows.

Transaction Table

The transaction table (TT) is an internal serialization mechanism used to house the counts of ongoing flows, and is not, in this example, displayed from the BR UI or anywhere else. In one implementation, it may include these record types, as examples:

1. RS TT

The "RS TT" record is used to ensure that lower priority Category 4 flows do not block the higher priority Category 1 and Category 3 flows. This record is used to maintain a count of the in-progress Category 1 and Category 3 flows. At the beginning of each Category 1 and Category 3 flows, the RS TT record is read with cursor stability (Read CS). A count of currently in-progress Category 1 and Category 3 flows in the RS TT record is incremented at the start of Category 1 and Category 3 flows and decremented at the end of Category 1 and Category 3 flows. Category 4 flows read the RS TT record without serialization at the beginning of the flow. If the count of in-progress Category 1 and Category 3 operations is not zero, the Category 4 flow ends before making any alterations to the environment.

2. C4INPROGRESS

As a fail-safe means for preventing new or aborting existing Category 4 flows, available facilities, such as the z/OS® DB2® programming interface, called the Instrumentation Facility Interface (IFI), is used. At the beginning of the C4 (Category 4) flows, this record is read with Cursor Stability Isolation, substantially immediately after the read of the RS TT record for that Recovery Segment without serialization. If a C4 flow is blocking a C1 (Category 1) or C3 (Category 3), then the IFI interface is invoked to abort the DB2® threads locking on the "C4INPROGRESS" resource.

The transaction table is implemented, in one example, as a DB2® table in the Business Resilience datastore that physically resides in the BR environment. The database is created at installation time, and the transaction table is created and initialized (if necessary) at that time. It is not associated with any particular BRM and is thus, not used to persist any resource properties. The typical access mechanism is via, for instance, JDBC calls from the BRM and associated RS(s) using JDBC type 4 drivers.

One embodiment of the fields of a RS TT record is described below:

| Data Field | Data Type | Description | Keys | Index |
|---|---|---|---|---|
| TRANSACTION_TABLE_ID | Integer | Generated integer key for uniqueness via a DB2 sequence. Note all primary keys in the BR database will be a generated integer for compatibility with other non-DB2 databases. | Primary | |
| RS_ID | Integer | Foreign key from the Recovery Segment table that can be used to retrieve all the transaction entries for a particular RS | Foreign | |
| KEY | Varchar(32) | "RS TT" "C4INPROGRESS" | | |
| C1_COUNT | Integer | A count of currently in-progress Category 1 flows | | |
| C1_COUNT_ACCUM | Integer | Accumulated count of Category 1 flows | | |
| C3_COUNT | Integer | A count of currently in-progress Category 3 flows | | |
| C3_COUNT_ACCUM | Integer | Accumulated count of Category 3 flows | | |
| WF_DIE_NOW | Char(1) | Flag to indicate that a workflow associated with a RS is to stop | | |
| TS_UPDATE | Timestamp | Timestamp of initial create or last update and defaults to current timestamp | | |

Pattern for Administrative Flows

One embodiment of a general pattern for administrative flows is described with reference to FIGS. 9A-9D. As one example, the RS component of the BR system performs this logic. Note that there are STEPs which may not be performed by all Category 4 flows. In particular, non-transaction processing of a flow may or may not be required (STEP 910). Further note: STEPs 900 thru 908 may be referred to as "PreventNew" (also, STEPS 1004 thru 1008 of FIG. 10A); STEPs 924 thru 928 may be referred to as "OpenWindow"; STEPs 940 thru 944 may be referred to as "PrioDBUpdate". In this general flow, the RS.SummaryState is retrieved without serialization prior to a set of processing and retrieved a second time with serialization just prior to making changes from the flow accessible to other flows (STEPs 914, 930). Not all Category 4 flows may require checking of RS.SummaryState, in which case these STEPs are not performed.

Category 4 flows which may alter the BR configuration as described above run concurrently with potential conflicts detected through retrieving the RS.SummaryState without serialization at the start of processing and retrieving the RS.SummaryState with serialization just before making changes visible to other BR flows. If the RS.SummaryState changed from when initially fetched to when updates are to be made visible, the Category 4 flow does not make changes to the RS, aborts and may reexecute. Note also that the same logic may apply to other BR data where required by a particular Category 4 flow. That is, retrieving a BR data object without serialization to make a determination of processing, and subsequently, immediately prior to making visible updates, retrieve and check that no change has occurred on that same BR data object with serialization. A prime example of this pattern is found where administrative or operational states of a RS are evaluated to determine if a flow is to be allowed given the current runtime state of a RS. The RS state(s) are retrieved without serialization to determine if processing can proceed and retrieved with serialization and checked again for having acceptable values just prior to making visible updates of the flow.

Referring to FIG. 9A, processing begins with retrieval of the RS TT record without serialization, STEP 900. The count of Category 1 and Category 3 flows are checked to be zero, INQUIRY 902. If there are current Category 1 or Category 3 flows in-progress, the Category 4 flow aborts processing and ends, STEP 904. Otherwise, if the Category 4 flow is executing on, for instance, a z/OS® operating system environment, INQUIRY 906, the C4INPROGRESS record is read with serialization to record the presence of this Category 4 flow, STEP 908. Thereafter, or if not on a z/OS®, any non-transactional processing, such as UI interactions, are performed, STEP 910.

A transaction is started for transactional processing, STEP 912. The RS.SummaryState is retrieved without serialization and preserved for checking any changes to the RS environment just prior to making updates visible to other BR flows, STEP 914. If processing for the Category 4 flow has not completed necessary processing INQUIRY 916 (FIG. 9B), BR data objects are retrieved without serialization, STEP 918, as required for the next phase of the Category 4 flow. Processing on a set of BR data objects retrieved is performed after which a determination is made if additional processing is required, INQUIRY 920. If further processing is not to be performed, updates of this phase of processing are saved in a temporary array, STEP 922, and processing continues at INQUIRY 916. Otherwise, the RS TT is read without serialization, STEP 924. If the count of Category 1 and Category 3 flows in-progress continues to be 0, INQUIRY 926, updates of this phase of processing are saved in the temporary array, STEP 922, and the next phase of the Category 4 flow may be started. Otherwise, the Category 4 flow is aborted, STEP 928, and ends.

Figure 9B:
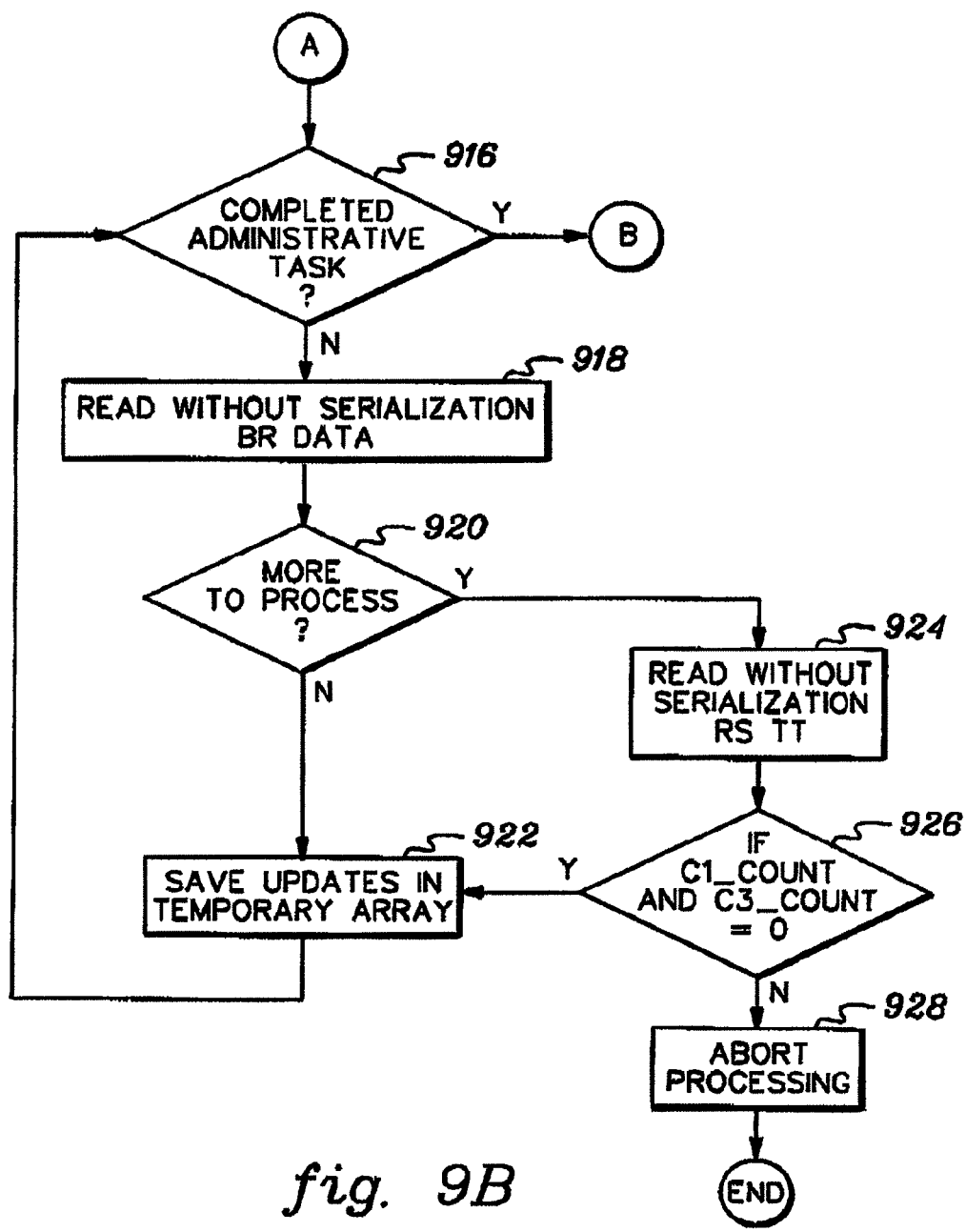
Figure 9C:
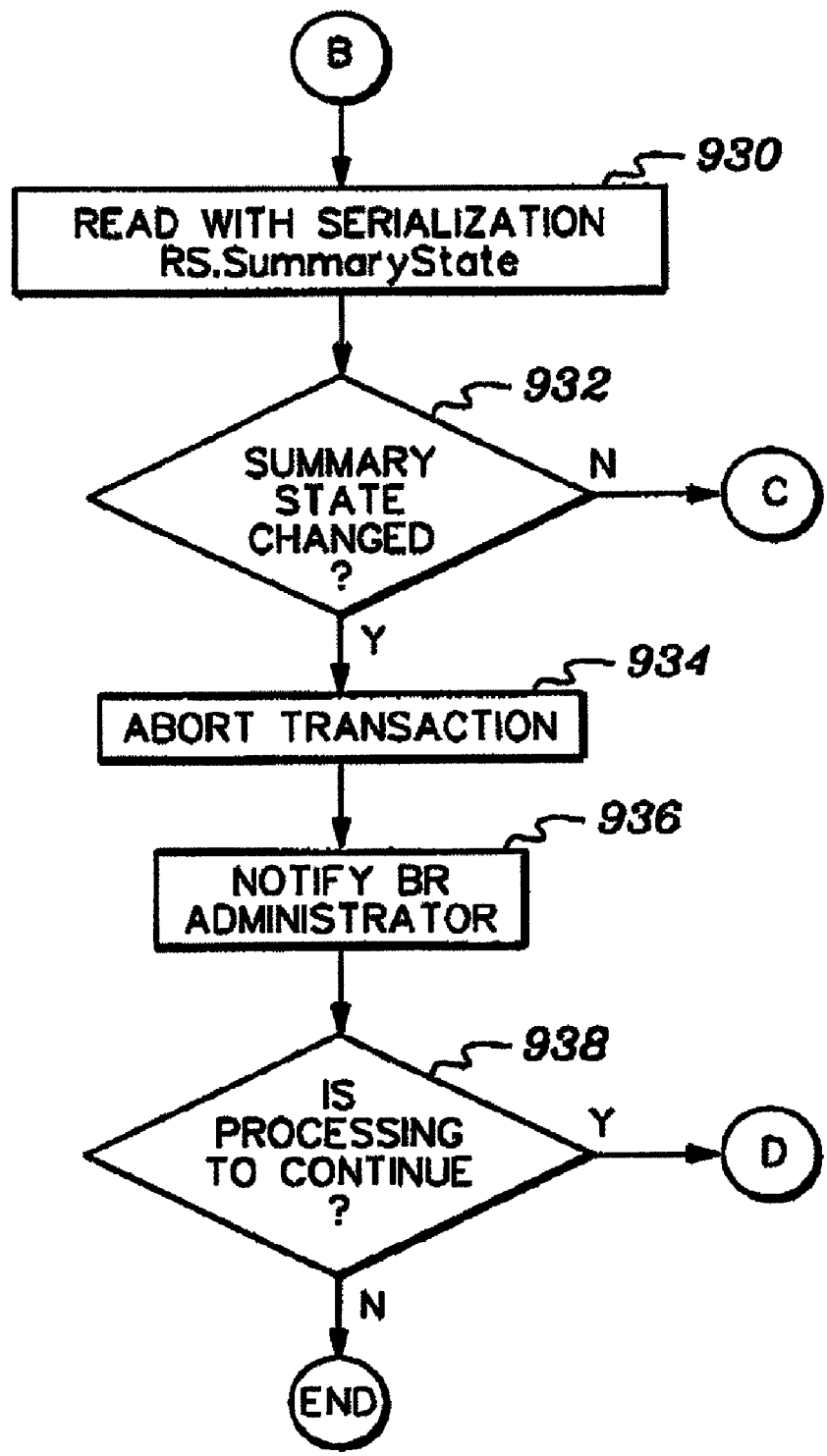

When the Category 4 flow has completed all phases of processing, INQUIRY 916, the RS.SummaryState is read with serialization, STEP 930 (FIG. 9C). If the RS.SummaryState read with serialization is not the same as that read earlier without serialization, INQUIRY 932, another flow altered the configuration associated with the Category 4 flow. Processing is aborted, STEP 934, and the BR administrator is notified, which may occur through a UI interaction or through posting notification to the mailbox, STEP 936. If the flow is under the control of the UI and a BR administrator is engaged with the Category 4 flow, the flow may continue at the BR administrator's request from INQUIRY 938 to STEP 900 (FIG. 9A). Otherwise, the Category 4 flow ends.

Figure 9D:
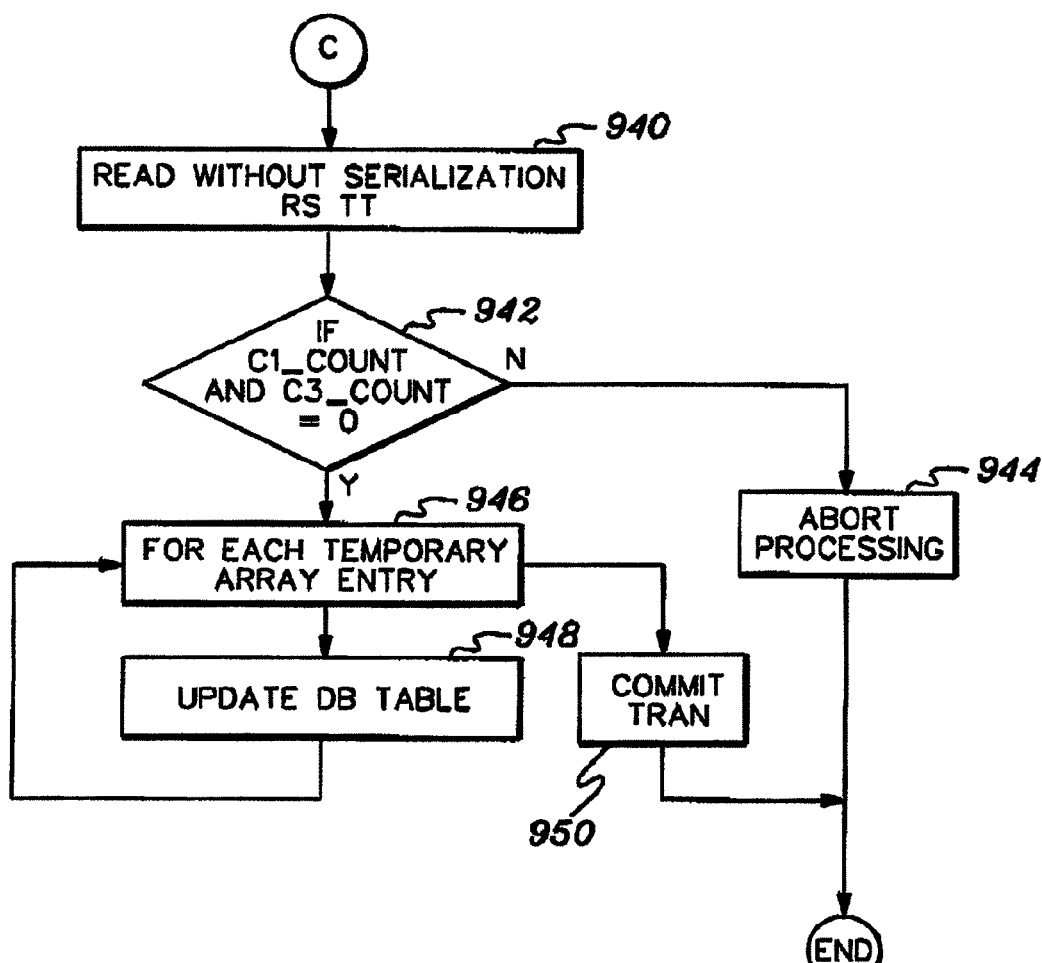

Returning to INQUIRY 932, if the RS.SummaryState is unchanged, the RS TT is read with serialization, STEP 940 (FIG. 9D). The count of in-progress Category 1 and Category 3 flows is tested to be equal to zero, INQUIRY 942. If there are any Category 1 or Category 3 flows in-progress, the Category 4 flow aborts processing, STEP 944, and ends. Otherwise, each temporary array entry created during execution of the Category 4 flow, STEP 946, is used to update BR data externally recorded in a database and made visible to other flows, STEP 948. When all database updates have been made, the Category 4 flow commits changes, STEP 950, and ends.

The admin pattern described above applies to Category 4 flows, including, for instance, define RS, define RG, define policy, validate, define pairing.

Pattern for Workflow Flows

One embodiment of a general pattern for flows related to workflow processing is described with reference to FIGS. 10A-10C, FIGS. 11A-11B and FIG. 12. In particular, STEPs 1000-1048 (FIGS. 10A-10C) are a Category 4 flow processing a workflow and verifying that the RS configuration is the same as when the workflow was initially formed before submitting the workflow for execution. As further examples, the STEPs of FIGS. 11A-11B are a Category 3 flow and related monitoring of the workflow activities including submission of the undo workflow, if required. If the Category 3 flow is terminated due to initiation of a Category 1 flow, the BR administrator is engaged to determine what undo processing is appropriate, as described with reference to the STEPs of FIG. 12. Note, STEPs 1032 through 1044 may be referred to as "StartC3ser" and STEPs 1116 through 1118 (also STEPs 1210 through 1212) may be referred to as "EndC3ser". As one example, the RS performs this logic.

Figure 10A:
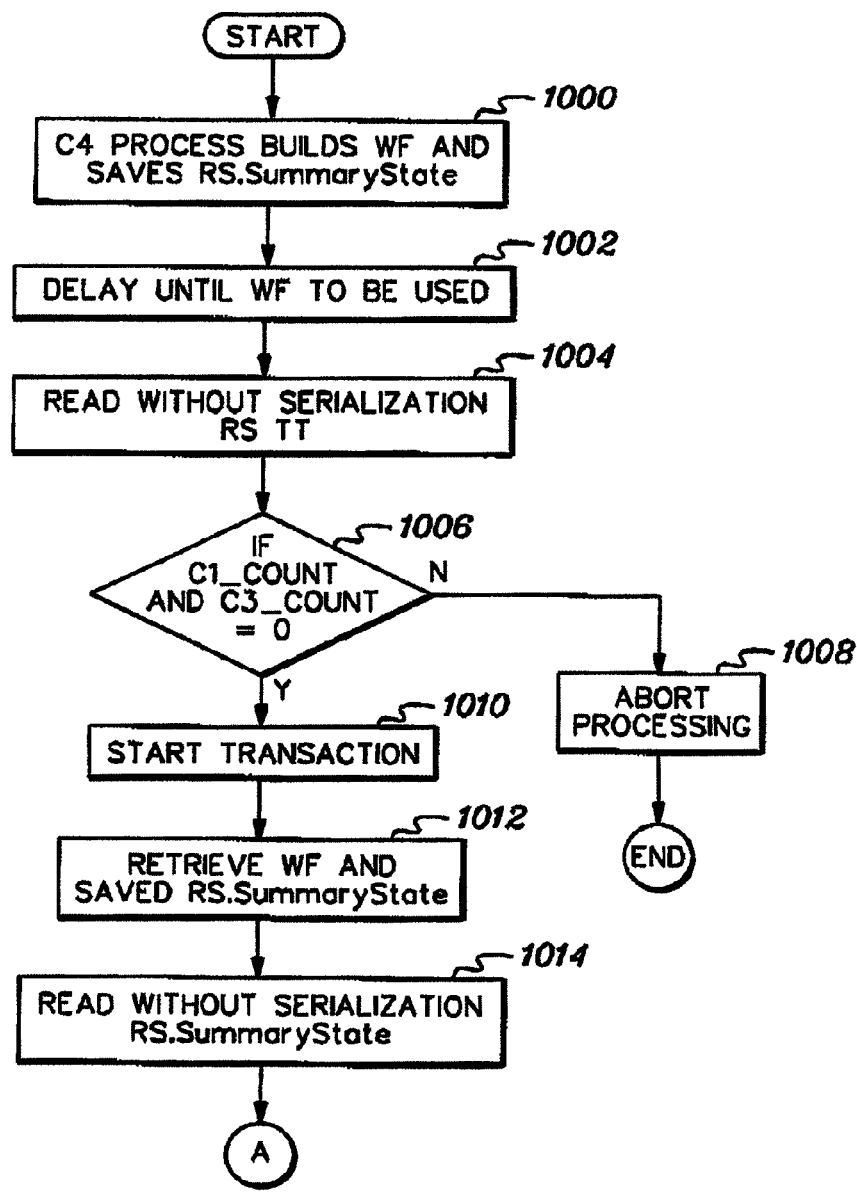
FIGS. 10A-10C depict one embodiment of the logic to provide a general pattern for Category 3 processing of a workflow, in accordance with an aspect of the present invention.
Figure 10B:
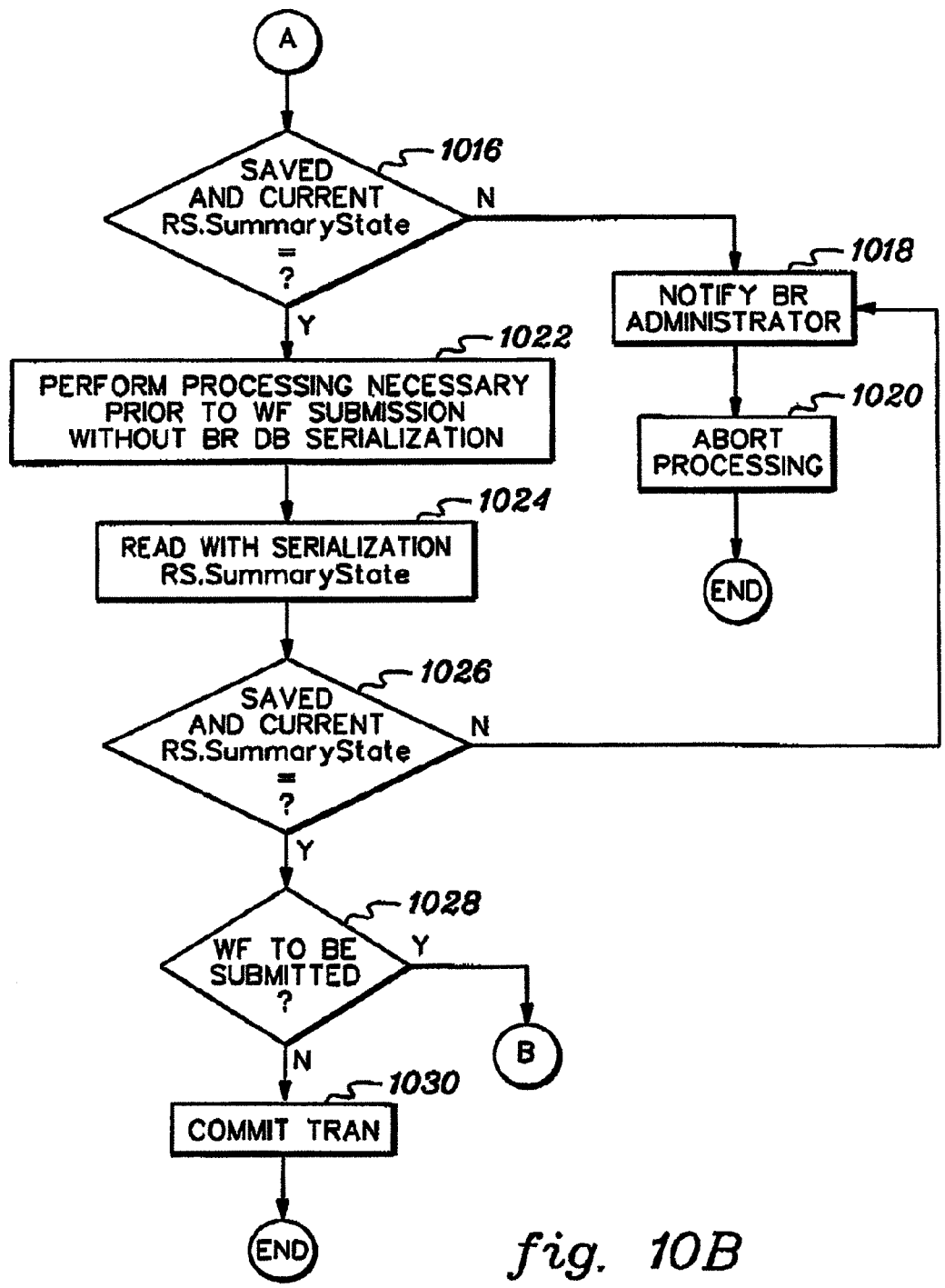
Figure 11A:
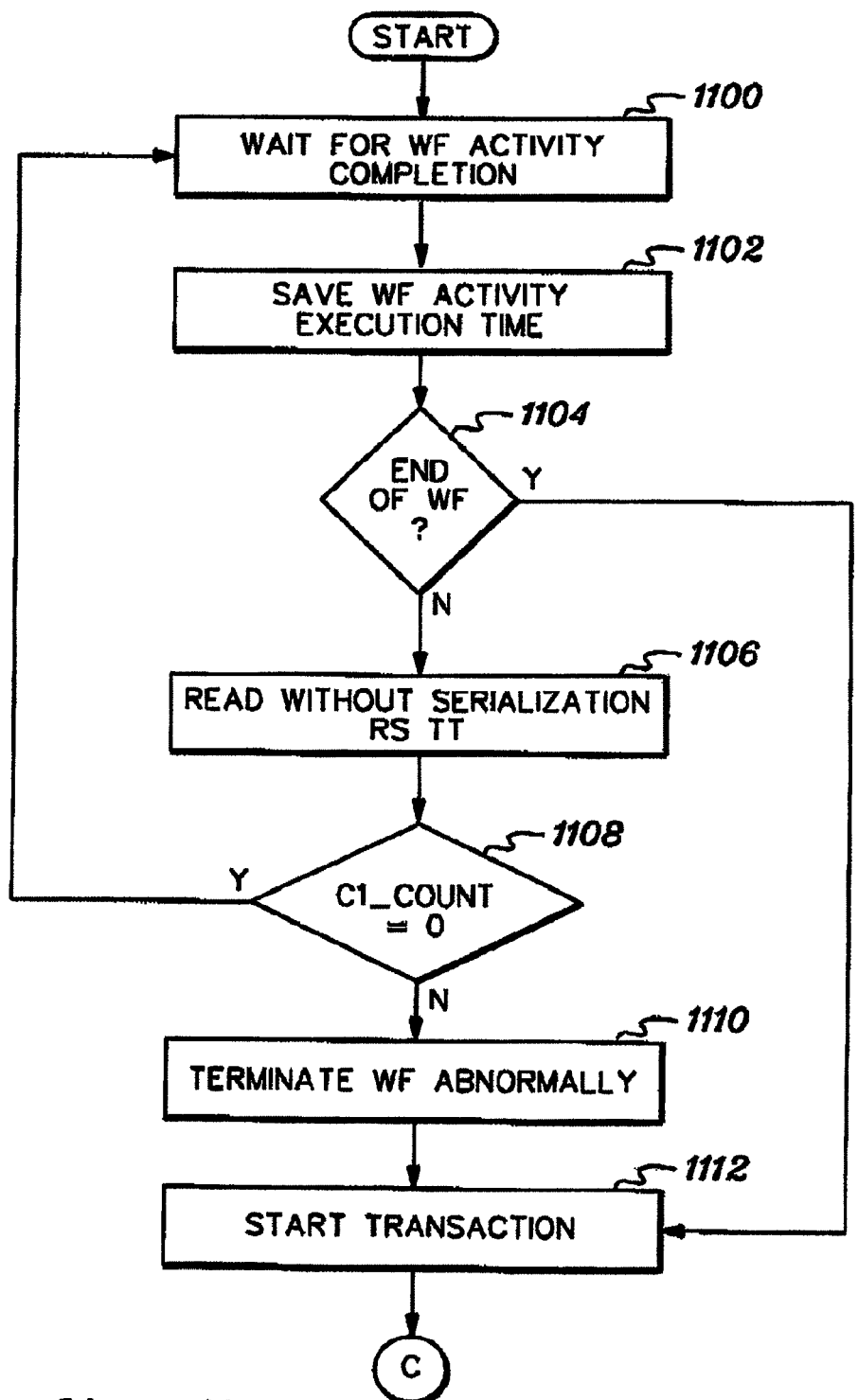
FIGS. 11A-11B depict one embodiment of the logic to provide monitoring of completion of Category 3 processing of a workflow, in accordance with an aspect of the present invention.
Figure 11B:
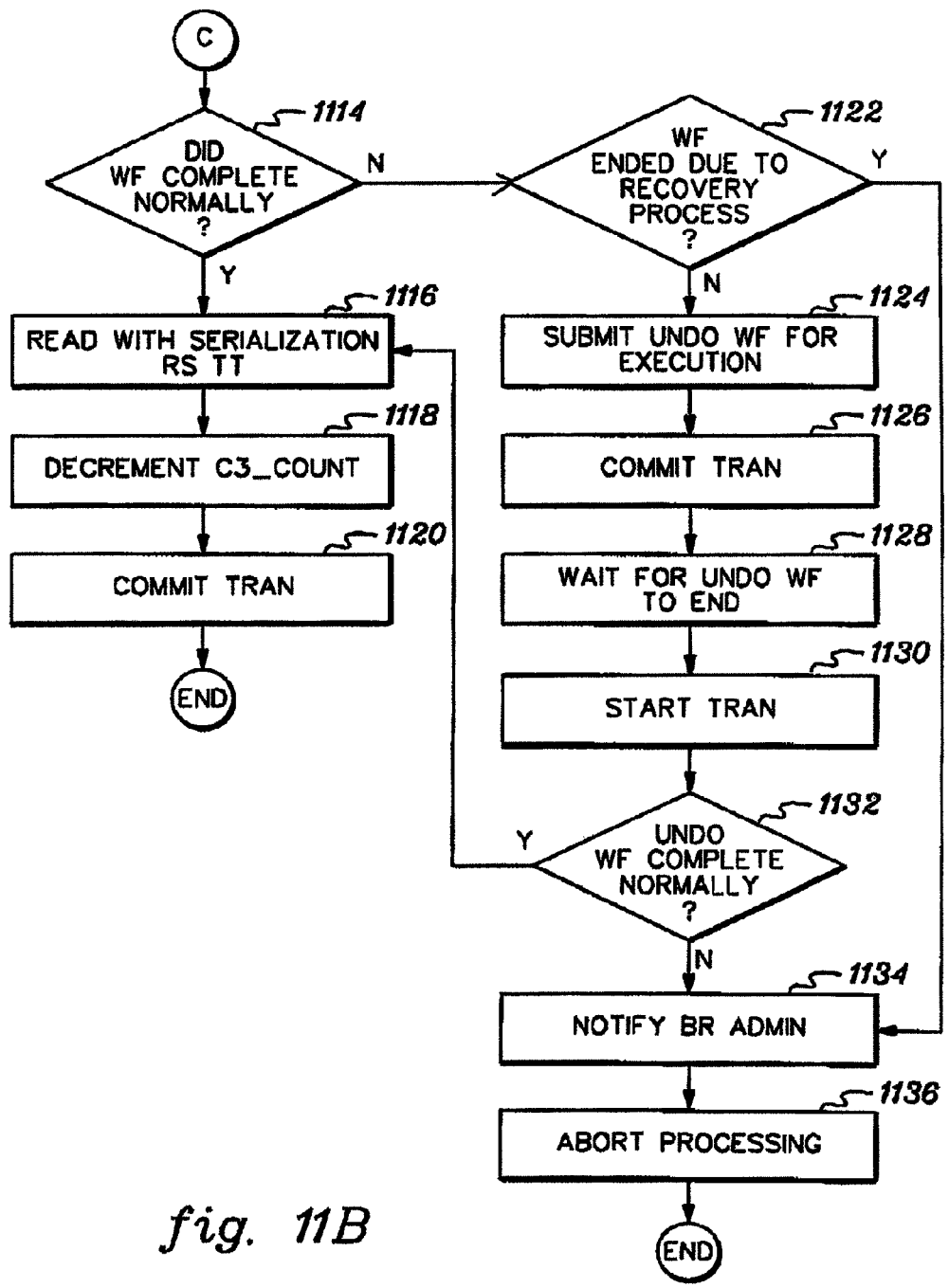
Figure 12:
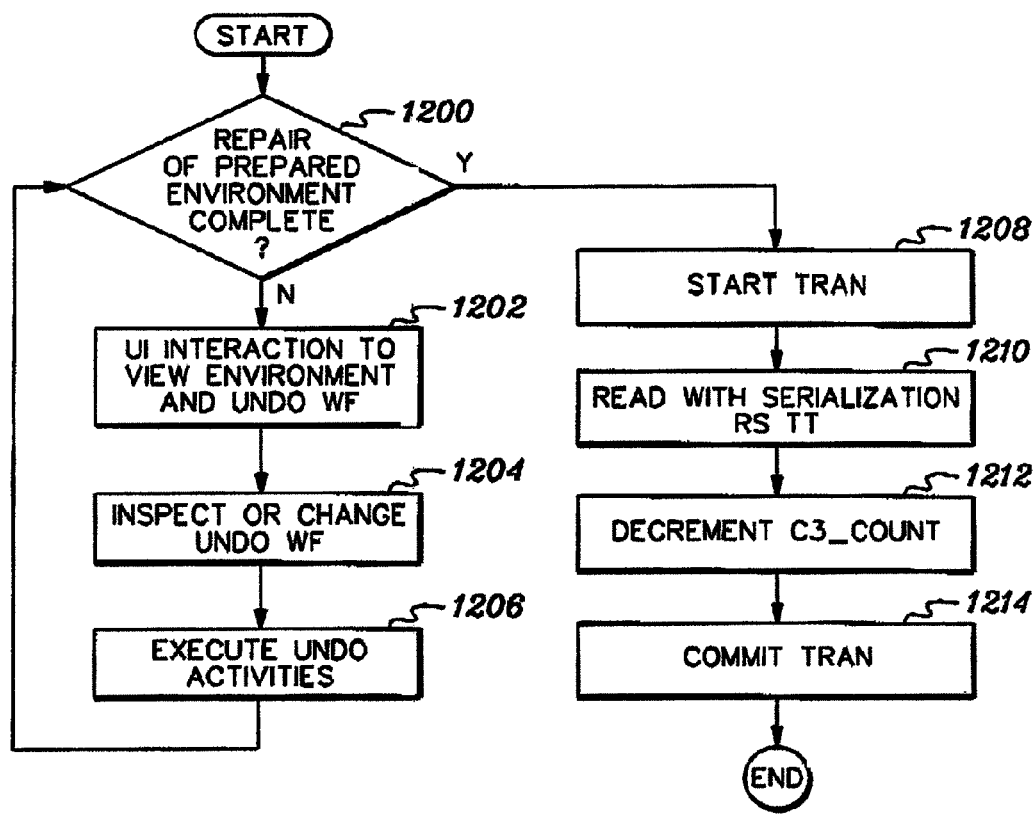
FIG. 12 depicts one embodiment of the logic to determine the completion of undo processing that is appropriate, in accordance with an aspect of the present invention.

Referring to FIG. 10A, a Category 4 flow builds the workflow and saves with the workflow the RS.SummaryState current at that time, STEP 1000. In one example, the processing of STEP 1000 is achieved through processing performed in validating a policy and forming the preparatory workflow, examples of which are described below.

Defining and validating the achievability of a goal, such as an availability goal, may be performed manually or through use of the processing described in an above-referenced co-filed patent application. Defining, for instance, an availability goal includes associating a quantitative goal, such as a Recovery Time Objective (RTO), with a business application. In one implementation, a business application is represented programmatically by a Recovery Segment (RS).

When a goal is associated with a business application, it is desirable to predict whether or not that goal is achievable. That is the responsibility of validation. Validation can be performed by human inspection of the resources supporting the business application, followed by an analysis of recovery operations those resources may support and a further analysis of the ordering and execution time of the set of recovery operations.

The validating process referenced herein is programmatic and performs the following steps, as an example: a goal in the form of a policy is specified by the BR administrator through the BR provided User Interface (UI). Additionally, a representation of the customer environment may be specified, as in one implementation, through a PSE, and a representation of the business application is specified, as in one implementation through a RS. A worst case scenario in which recovery for all resources associated with the RS is used to determine if the goal is achievable. Recovery operations for each resource and the execution duration time for each recovery operation could be specified through a file or database table. Alternatively, recovery operations and related execution duration times, in the context of a particular customer environment, may be associated with a PSE. Further, recovery operations which result in a resource becoming available from a failed or degraded state may be represented through pairings. A technique for selecting a recovery operation is employed. One such technique may be selection from potential recovery operations the one recovery operation having the smallest operation execution duration time.

Having selected recovery operations for resources supporting the business application, any dependencies those operations may have on other operations are identified. This identification could be through specification of dependencies in a file or database table. Alternatively, operation ordering dependencies may be specified through pairings. Operations which are depended on are added to the set of recovery operations. Subsequently, any ordering dependencies among recovery operations in the set are identified and used to sequence operations. Ordering dependencies may be specified through a file or database table. Alternatively, ordering dependencies may be specified through pairings. From the ordered set of operations, a total recovery time may be calculated manually. Alternatively, a programmatic representation of the recovery set of operations may be generated in the form of a Gantt chart from which the maximum time for executing the sequence of recovery operations may be determined.

In order to validate the achievability of a quantitative goal, such as an availability goal, it may be necessary or desired to evaluate the preconditioned state of the IT environment. Preconditioning may include specific actions taken on each resource. For example, establishing a flash copy set for a storage resource, establishing an active data sharing environment for a database resource, or establishing a level of redundancy in containers supporting application logic. Manual inspection of the IT environment may be performed to make the evaluation and to identify preparatory actions to make achievement of the goal possible. Alternatively, a programmatic technique is used to evaluate and achieve the preconditioning. Changes may occur in the scope of resources associated with a business application or with the goal to be achieved for availability. Should such changes arise, revalidation may be performed. Detection of the need for and execution of revalidation could be performed through human intervention. Alternatively, synergistic processing with change in scope and change in goal processing can be used to detect and enable revalidation of achievability for a goal and initiation of actions to prepare the IT environment.

The current state of resources is determined and used in conjunction with preparatory effect pairing constructs to determine if the current state of a resource can meet the recovery goals or if operations to alter the current state of the resource, preparatory operations, are needed to enable achievement of the recovery goal. Where preparatory operations are required, precursor operations and dependencies among the set of operations is determined using pairings. The set of preparatory operations may then be formed into a workflow and provided to the customer for programmatic execution or manual execution. After the IT environment has been altered by a set of preconditioning actions, a subsequent validation of achievability for the goal detects the alterations resulting in a potentially different set or a null set of preconditioning actions.

Where pairing constructs were utilized above, those constructs may be conditionally included in BR system processing based on trigger rules and real-time IT environment conditions.

If preconditioning actions (a.k.a., Preparatory processing) are used, some of the preparatory operations may fail to execute correctly. Should a failure of a preparatory operation occur, the IT environment may need to be returned to the prior state. An undo set of operations may be formed and executed manually through human intervention. Alternatively, a programmatic formation of an undo workflow process to be conditionally executed may be used, should a preparatory workflow result in failed operations. Formation of the undo workflow uses pairing constructs to identify undo operations.

When an IT environment has been preconditioned through preparatory actions to assure achievability of a goal, it is monitored, in one example, to insure prepared resources do not become changed such that the goal would fail to be achievable. Monitoring of the prepared environment may be achieved through manual, human intervention or through monitoring associated with individual products and coordinated by the customer.

Continuing with the flow of FIG. 10A, a delay may be introduced after which the BR administrator determines the workflow should be executed, STEP 1002. The delay is chosen by the administrator, as one example, and may be dictated by, for instance, business cycle, timeframe commitment to provide service, etc. As an example, after the delay, which may be hours or days in duration, the RS TT is read without serialization, STEP 1004. If the count of Category 1 and Category 3 flows in-progress is not zero, INQUIRY 1006, this flow aborts, STEP 1008, and is ended. Otherwise, a transaction is started, STEP 1010, and the saved workflow and saved RS.SummaryState are retrieved, STEP 1012. The current RS.SummaryState is read without serialization, STEP 1014. If the saved and current RS.SummaryState are not equal, INQUIRY 1016 (FIG. 10B), a change to the RS configuration has occurred since the workflow was created. The BR administrator is notified, STEP 1018, and processing of this flow aborts, STEP 1020, ending the flow.

Otherwise, the RS configuration has not changed since the workflow was created, INQUIRY 1016. Processing related to the workflow is performed referencing BR data without serialization, STEP 1022. When processing related to the workflow other than the submission of the workflow has completed, the RS.SummaryState is retrieved with serialization, STEP 1024, and compared to the RS.SummaryState saved with the workflow. If a change has occurred in the RS configuration, INQUIRY 1026, the BR administrator is notified, STEP 1018, the flow aborts, STEP 1020, and is ended.

Figure 10C:
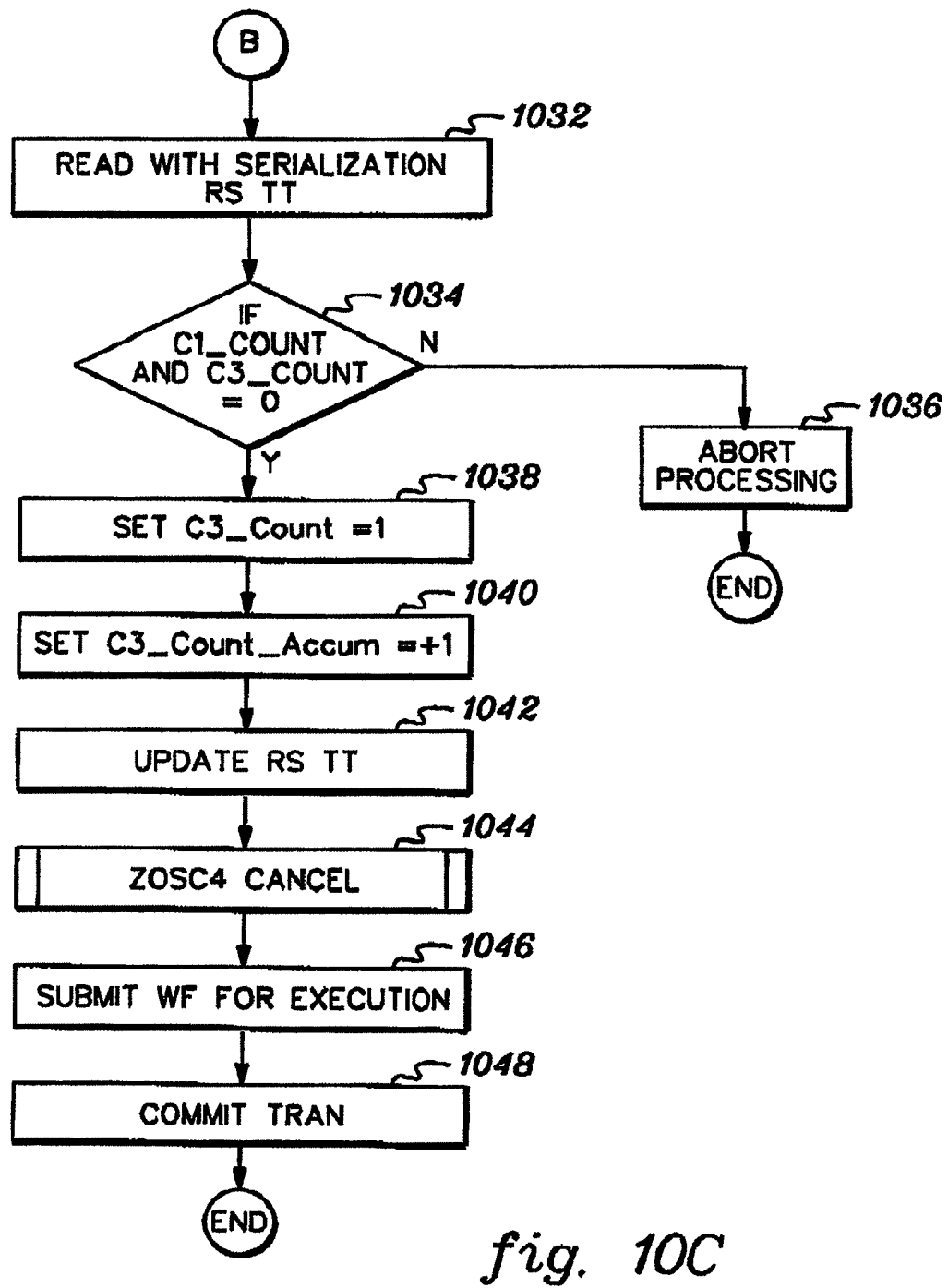

Otherwise, a determination is made if the workflow is to be submitted, INQUIRY 1028. If not, the transaction is committed, STEP 1030, and this flow ends. Otherwise, the workflow is to be submitted and the RS TT is read with serialization, STEP 1032 (FIG. 10C). If the count of in-progress Category 1 and Category 3 flows is not zero, INQUIRY 1034, this flow aborts, STEP 1036, and is ended. Otherwise, the count of Category 3 flows in-progress is set to one, STEP 1038, and the accumulated count of Category 3 flows is incremented by one, STEP 1040. The RS TT is updated, STEP 1042, and the z/OS® routine to cancel in-progress Category 4 flows is invoked asynchronously, STEP 1044. The workflow is submitted for execution, STEP 1046, the transaction is committed, STEP 1048, and the flow ends.

As the workflow executes, activities within the workflow are initiated and complete. The BR process monitoring the workflow waits for a workflow activity to complete, STEP 1100 (FIG. 11A). When an activity of a workflow completes, the execution time associated with the activity is recorded in BR data, STEP 1102. If the end of the workflow has not been reached, INQUIRY 1104, the RS TT is read without serialization, STEP 1106. If the count of Category 1 flows in-progress is zero, INQUIRY 1108, the workflow monitor awaits completion of the next workflow activity. Otherwise, a Category 1 flow for recovery is in-progress. The workflow is terminated abnormally, STEP 1110.

Subsequently, or when the workflow ends, a transaction is started, STEP 1112. If the workflow completed normally, INQUIRY 1114 (FIG. 11B), the RS TT is read with serialization, STEP 1116, and the count of in-progress Category 3 flows is decremented by one, STEP 1118. The transaction is committed, STEP 1120, and the flow ends.

If the workflow did not end normally, INQUIRY 1114, a determination is made regarding ending the workflow due to detection of a Category 1 recovery process, INQUIRY 1122. If a Category 1 recovery process did not end the workflow, the undo workflow is submitted, STEP 1124, and the transaction is committed, STEP 1126. After waiting for the undo workflow to complete, STEP 1128, a transaction is started, STEP 1130. If the undo workflow ended normally, INQUIRY 1132, processing proceeds to complete the Category 3 flow with STEPs 1116 through 1120. Otherwise, or if the workflow was ended due to a Category 1 recovery process, the BR administrator is notified, STEP 1134, processing is aborted, STEP 1136, and the flow ends.

If a workflow is terminated due to a Category 1 recovery process or if an undo workflow ends abnormally, the BR administrator takes action to repair the IT environment. BR provides notification to the BR administrator and awaits intervention. The BR administrator invokes BR processing through the UI at which time repair of the IT environment may have been completed. If repair has not been completed, INQUIRY 1200 (FIG. 12), the BR environment and undo workflow are made available for inspection by the BR administrator, STEP 1202. The undo workflow may be altered by the BR administrator, STEP 1204, and activities of the undo workflow may be performed manually or through submission of the modified undo workflow, STEP 1206.

When the IT environment has been repaired, INQUIRY 1200, a transaction is started, STEP 1208, and the RS TT is read with serialization, STEP 1210. The count of in-progress Category 3 flows is decremented by one, STEP 1212, and the transaction is committed, STEP 1214, ending the flow.

Pattern for Recovery Flow

One embodiment of a general pattern of flows for Category 1, recovery processes, is described with reference to FIGS. 13A-13B. As one example, the BRM performs the logic. Note that STEPs 1302 through 1306 may be referred to as "StartC1ser", and STEPs 1322 through 1324 may be referred to as "EndC1ser".

Figure 13A:
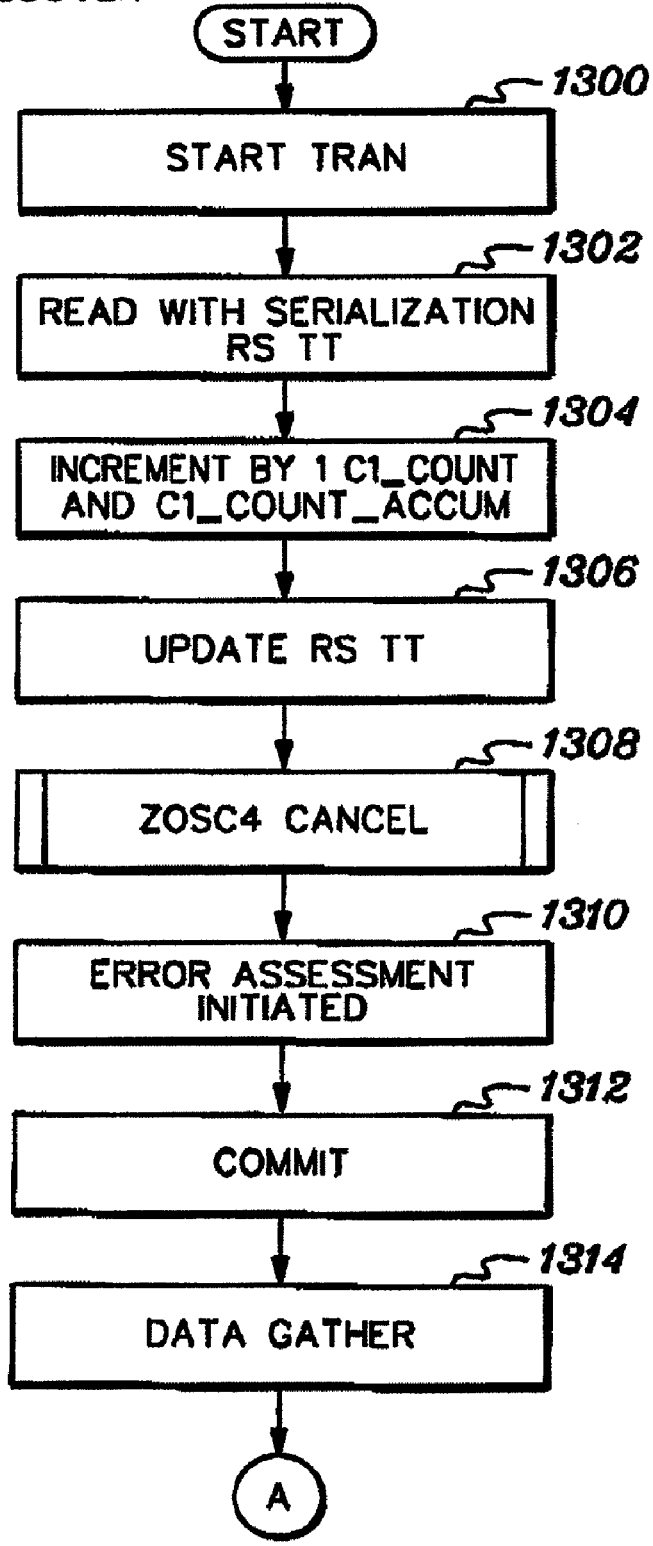
FIGS. 13A-13B depict one embodiment of the logic to provide a general pattern for recovery, in accordance with an aspect of the present invention.

Referring to FIG. 13A, a transaction is started when a recovery process is initially detected as being required, STEP 1300. The RS TT is read with serialization, 1302. The count of in-progress Category 1 flows and accumulated count of Category 1 flows is incremented by one, STEP 1304. The RS TT is updated, STEP 1306, and the z/OS® routine to terminate in-progress Category 4 flows is initiated asynchronously, STEP 1308. The critical process is then initiated, and in one example, that critical process may be error assessment, STEP 1310. This may be accomplished, for instance, through the processing described for creating a new CR or adding resources to an existing CR. For example,

- A Recovery Segment with an active policy associated with it receives property state change events for any resource in it. Additionally, state of resources, RS and RG are evaluated during ongoing monitoring and periodic poll processing. Once the RS receives that event it is to determine whether it is an indication of a failure or not. The RS makes that determination based on the pairing rules in place for the resources and relationships involved in the event.
- The first event of a failure resulting from the state change on the Recovery Segment ensures the creation of a new CR. For each subsequent event, while the Recovery Segment is in a state that is not Available, the events flow immediately (in one example) to the BRM, which decides whether to create a new CR for the resource associated with that event, or whether to merge the resource into an existing CR. That determination is fairly straightforward-if the BRM notices that there is any overlap between an existing CR and the impacted resource list provided from the RS, those resources from the impacted list can be added to that CR (assuming of course that the timing interval for that CR is still open for inclusion of new resources—if it is closed, then a new CR is created.) If there is no overlap with any existing CR, then the BRM creates a new CR.
- Once a time interval for gathering current resource status expires for any CR, the timing window for that CR is closed to incoming errors, and the resources for any other errors go into the formation of a new CR.
- When an error or state change of a resource is received by BR, the RS assesses state. In addition, related resources that have not yet failed are evaluated for impact. During processing of events reported for resources in a RS, impact pairings are used.
    - This technique takes an input list of impacted resources, and outputs an ImpactedResList that includes one entry per resource with each entry, including, for example: Resource id, State, Aggregated State, Reason for Inclusion (either as a causing resource or resource made failed or degraded from a causing resource).
    - Using input resource, select all impact pairings.
    - For each impact pairing that is evaluated to be currently applicable, add the resource and related information to the ImpactedResList.
    - Note that only those resources that have a direct impact relationship to the resource identified in the event report are included in this assessment. This first level analysis is expanded before retrieving resource state to insure the resources impacted are included in the CR. Performing the first level of impact analysis at this point provides a means to find immediately related events for management of CRs, while not consuming excessive processing time to transverse the entire potential set of impacted resources on each reported event.
- For each of the resources in the ImpactedResList, aggregated state is evaluated. The aggregated state is stored in the ImpactedResList and in the BR management data associated with the resource, as examples.
- The first event of a failure resulting from the state change on the Recovery Segment ensures the creation of a new CR. For each subsequent event, while any CR is not in an Free state, BR decides whether to create a new CR for the resource associated with that event, or whether to merge the ImpactedResList for that event into an existing CR. BR examines the newly created ImpactedResList and the list of resources associated with any CR that has not closed processing to inclusion of new events. Overlaps in the newly created ImpactedResList and any CR open to inclusion of new events results in merging of the new event with one or more existing CRs. The CR with the oldest first event time is updated with the union of resources in merged resource lists. Any CR from which resources were taken to build the merged CR are returned to the free pool or marked for free pool return when asynchronous processing completes.
- If there is no overlap with any existing CR, BR then creates a new CR.
- As part of the processing to accumulate related events for root cause analysis, when a new CR is created, intervals are established for initiating gathering of resource state information and closing the CR to inclusion of newly reported events in order to meet specified goals, such as RTO goals. When CR(s) and a newly reported event are merged, those intervals are re-established based on the updated view of resources related to the outage event being evaluated.

Continuing with FIG. 13A, the transaction is committed, STEP 1312, prior to the next phase of recovery flow processing which gathers data related to the set of resources, STEP 1314. For example:

- Processing for a CR includes gathering resource state information. If a CR has initiated gathering of resource state information, it may run to completion without further need of update, may have additional resources added to it via CR merge processing or may be flagged for return to the free pool if its contents were merged into another CR. For updates to the resource list, asynchronous resource state gathering is reinitiated in order to insure resource state is acquired after the time of latest event notification.
- Prior to initiating resource state gathering, BR constructs a directed acyclic graph (DAG) from the collection of resources already associated with the CR. For each resource, BR retrieves the pairings relating the resource to other resources impacted, e.g., either failed or degraded. For each pairing, the trigger set of conditions are evaluated and if the pairing is applicable in the current environment, the impacted resource is added to the ImpactedResList and made a candidate for further pairing evaluation. As with the initial list of resources associated with the CR, added resources are represented as a set of elements including resource, state, aggregated state and reason for being included in the ImpactedResList.

When all pairings have been evaluated, the revised content of the CR is assessed against other CR(s) which are eligible for inclusion of additional resources. If required, CR(s) are merged.

When an intermediary interval is reached, BR begins gathering state from the impacted set of resources to ensure their value for state is more recent than the last event received. The state information is to be verified explicitly since the eventing mechanisms may have an unbounded delay. In one embodiment, the information is not queried synchronously, since gathering state is performed in a time critical path, and queries that do not show a response are terminated in a time interval aligned with achieving the required RTO. These state queries are accomplished with the BR Asynchronous Distributor (BRAD). The output of the asynchronous build process is an array of resource states.

Resource state is gathered over an interval that correlates with the time BR calculated as acceptable for delay in gathering resource state information while still achieving RTO goals. For resources failing to respond within the allowable time interval, BR utilizes the last state retrieved through periodic monitoring or event processing. BR marks the potentially stale state used for consideration in building recovery actions.

Additionally, if during this asynchronous build process, if the BRM detects that there are overlapping resources in multiple CRs, which indicates that errors have been detected that impact related resources, the two CRs are merged into a single CR. The CR with the earliest start is preserved, the contents of the other are merged into it, and the extra CR is emptied and is ready to be reused (i.e., its state changes to Free).

As part of this asynchronous query build process, if it is detected that resources in the CR impact other resources such that they become failed and/or degraded (based on operation impact pairing rules), these impacted resources are added to the CR, as well help in the creation of the recovery process. This is referred to as the ballooning of the CR.

When the time interval set by BR as the maximum delay for including new resources in the CR is reached, the timing window for that CR is closed to incoming errors, and the resources for any other errors go into the formation of a new CR. At the close of the timing window for a CR, the operational state of the resources in the CR may have already been collected from asynchronous processing initiated earlier. Collection of resource state may be ongoing and not completed in which case completion of the asynchronous resource state gathering continues with the time limit previously established on responses to resource state queries. If resource state gathering has not been initiated at the time of closing the timing window, BR begins the asynchronous resource state collection process.

Figure 13B:
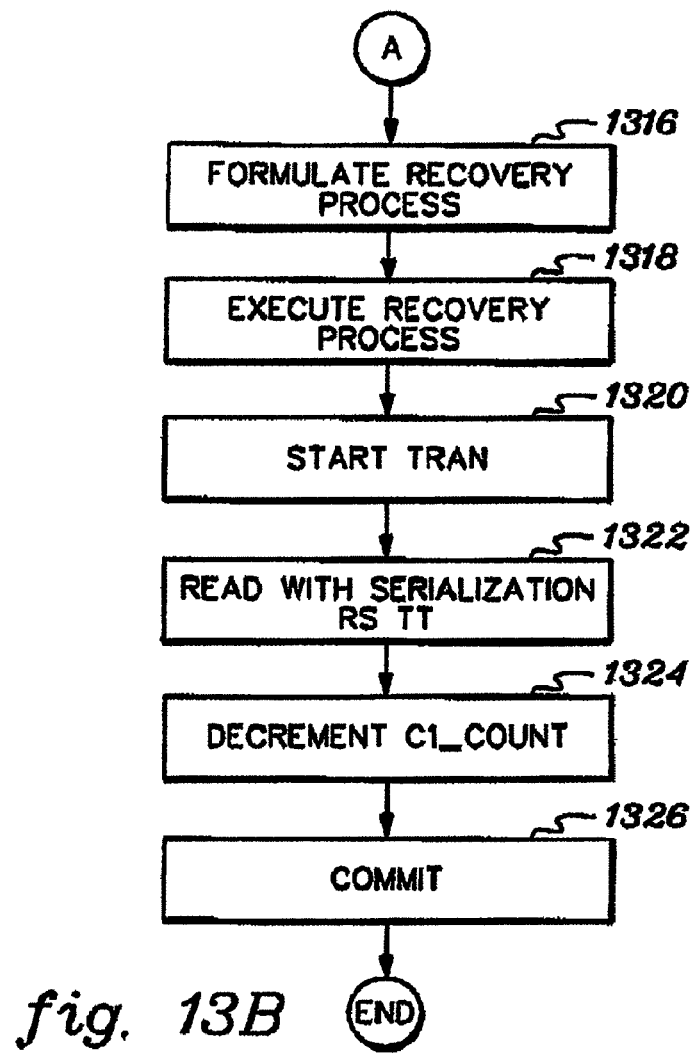

Subsequent to gathering resource data, a recovery process may be created, STEP 1316 (FIG. 13B).

In one implementation, this may be achieved through recovery processing. For example, Containment Region data formulated in the foregoing processing steps may be used to form a set of actions to alter the IT environment. For example, if outage events are used as the basis for CR formation, a recovery process may be constructed to alter the IT environment to restore a business application's service. If performance degradation related events were used as the basis for CR formation, a set of operations to alter the performance of the IT environment may be created.

As an example, recovery process formation may take one of many forms. A customer could take the data formulated in the CR and evaluate the implications of changes in resource state and property/values to manually construct a plan of action to restore IT services. Alternatively, the contents of the CR can be made available to each of the resources contributing to delivery of a business application for evaluation and independent recovery processing. A further alternative may be use of the CR content to form a recovery process by the BR system as outlined in the following.

The process of creating a recovery process is based on a sequential and aggregative series of steps. For example:
1. A CR may be populated with the failing resource and any impacted resources based on the state assessment rules. Recovery processing operates on the basis of the input list of resources for evaluation. If the techniques of CR processing are utilized, further advantages are gained in achieving recovery time goals and in correlating related failures.
2. Processing which delays for accumulation of errors may be followed by evaluation of the environment to determine if additional resources should be included in the evaluation of the outage.
3. Just prior to invoking recovery processing, current resource state may be retrieved.

At this point in time, the BRM has the following information available to it to generate a recovery process:
1. A list of resources which may be failed or degraded. In one implementation, this list may be contained in a Containment Region, and in particular, be represented by the CR. States array.
2. Resource relationships reflecting the impact a failure or degradation of one resource can have on other resource(s). In one implementation, this may be provided by impact pairings in the BRRD.
3. Operation ordering information indicating between two operations on the same or different resources if one operation is required to come before or after the other. In one implementation, this may be provided by operation ordering pairings in the BRRD.
4. Operation effect information indicating what execution of an operation on a resource may be to the state of the same or another resource. In one implementation, the information may be provided by operation effect pairings in the BRRD.
5. Order for operation escalation when a recovery operation fails. In one implementation, the information may be provided by Order and Vorder fields within the operation table.

The steps used to create a recovery process include:
1. For nonresponsive resources, determine if there is an operation to be invoked to place the resource in a determinate state. Iteratively process the one or more DAG(s) representing resources in the CR under evaluation for recovery processing from the root to the leaf nodes. Perform at most one operation to achieve a determinate state for each distinct branch of the DAG.
2. When all determinate actions on non-responsive resource have been undertaken, evaluate the DAG from root to leaf nodes. For each distinct branch of each DAG, perform one recovery operation for a failed or degraded resource.

3. For each iteration of the recovery process, invoke a routine to determine the set of dependent operations to be included in the set of recovery operations invoked.
4. For each iteration of the recovery process, invoke a routine to assess constraints on operations impacting resources supporting two or more business applications.
5. Invoke a routine to submit the recovery operations for each iteration of the recovery process. Activities to monitor the execution of the recovery operations are provided.
6. Monitoring of activities in the recovery process determine if additional iterations of recovery processing are required or desired or when recovery processing has succeeded in making the IT environment available.

After creating the recovery process, the recovery process may be executed, STEP 1318, as, for example, in iteratively submitting the recovery process and monitoring the recovery process.

When recovery processing has completed, a transaction is started, STEP 1320. The RS TT is read with serialization, STEP 1322, and the count of in-progress Category 1 flows is decremented by one, STEP 1324. The transaction is committed, STEP 1326, and the Category 1 flow ends.

z/OS® C4 Cancel Flow

Figure 14:
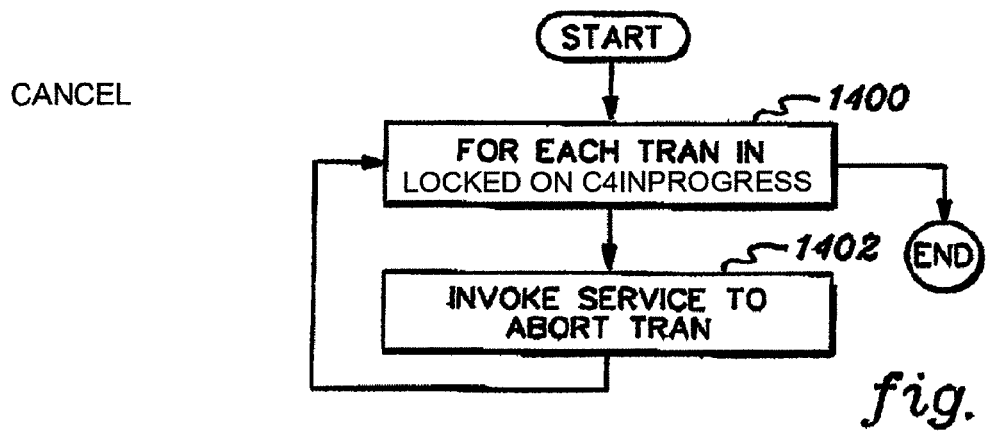
FIG. 14 depicts one embodiment of the logic to cancel a transaction, in accordance with an aspect of the present invention.

One embodiment of the logic to cancel a transaction is described with reference to FIG. 14. As one example, the RS performs this logic.

In the z/OS® DB2® database environment, there exists services to return identification of transactions holding serialization on a given database table row and for initiating termination of an identified transaction. These two services provided the basis for BR processing to terminate Category 4 flows in-progress at the time a Category 1 or Category 3 flow is initiated. The set of Category 4 flows in-progress is identified by those transactions having read with serialization, and therefore, locked on the C4INPROGRESS record. For each such transaction, STEP 1400, the DB2® service for initiating termination of the transaction is invoked, STEP 1402. When the in-progress Category 4 flows have been terminated, the routine ends.

Described in detail herein is a capability for using serialization to programmatically control execution of processes of differing priorities.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 15:
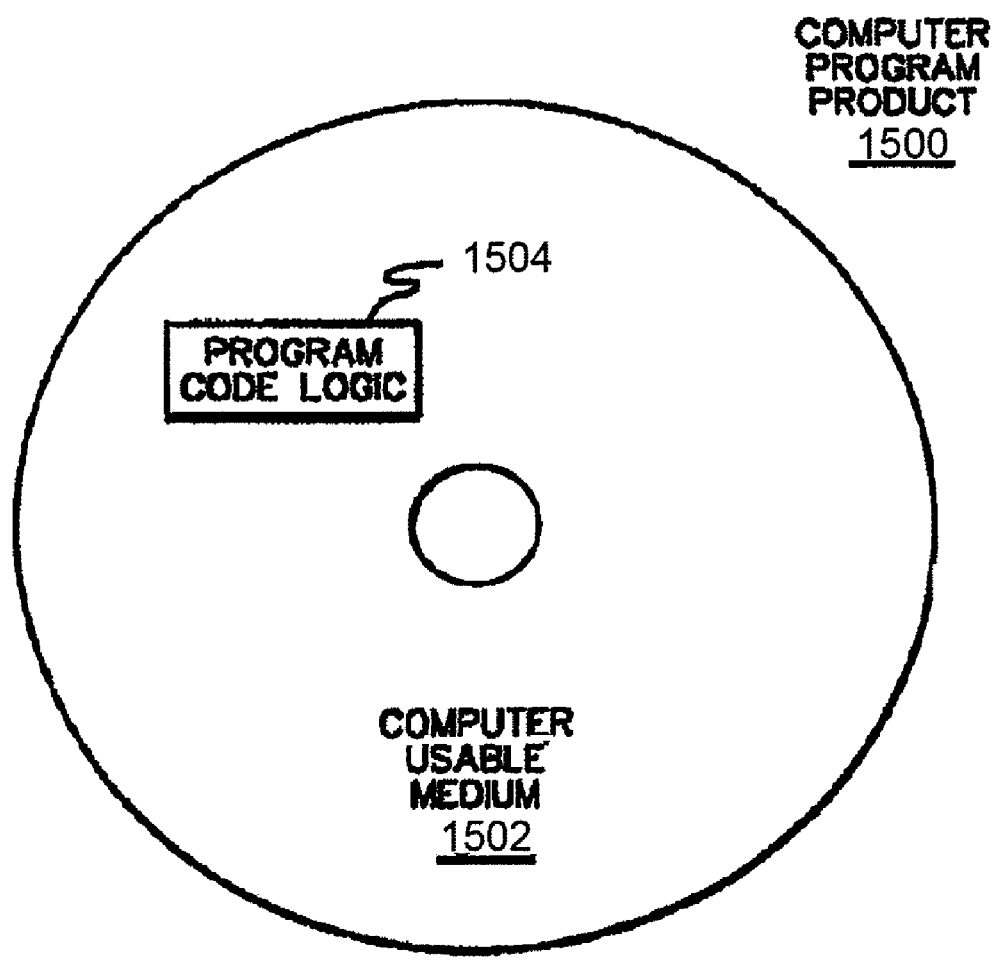
FIG. 15 depicts one embodiment of a computer program product incorporating one or more aspects of the present invention.

One example of an article of manufacture or a computer program product incorporating one or more aspects of the present invention is described with reference to FIG. 15. A computer program product 1500 includes, for instance, one or more computer usable media 1502 to store computer readable program code means or logic 1504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for programmatically categorizing processes of a computing environment, prioritizing those categories, and providing serialization to control execution of the processes based on priorities.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the STEPs (or operations) described therein without departing from the spirit of the invention. For instance, the STEPs may be performed in a differing order, or STEPs may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of managing processing within a computing environment, said method comprising:
    programmatically providing, without user intervention, a plurality of categories of processes, said plurality of categories of processes having a plurality of priorities associated therewith, and wherein the plurality of categories of processes comprises one or more of a category of critical processes, a category of monitoring processes, a category of preparatory processes, and a category of administrative processes, and wherein each category of the plurality of categories has a serialization protocol associated therewith to manage processing among the plurality of categories, and wherein the serialization protocol for one category is different from the serialization protocol of another category; and
    programmatically preventing execution, by a processor, of a process of one category of processes and allowing execution of a process of another category of processes, in response to detecting a change in configuration of an Information Technology (IT) environment, wherein the change in configuration comprises at least one of adding one or more resources to the IT environment to be used by a business application of the IT environment that employs a plurality of types of resources, removing one or more resources from the IT environment that are used by a business application that employs a plurality of types of resources, or altering a management policy of the IT environment, and wherein the preventing execution comprises blocking execution of the process or terminating execution of the process.

2. The computer-implemented method of claim 1, wherein the programmatically preventing comprises using serialization to control execution of processes, in which the execution of the process of the one category is prevented and execution of the process of the another category is allowed.

3. The computer-implemented method of claim 1, wherein the plurality of categories comprises a category of critical processes, a category of monitoring processes, a category of preparatory processes, and a category of administrative processes.

4. The computer-implemented method of claim 3, wherein the category of critical processes has the highest priority of the plurality of categories, the category of monitoring processes has the next highest priority, the category of preparatory processes has the second lowest priority, and the category of administrative processes has the lowest priority of the plurality of categories.

5. The computer-implemented method of claim 1, further comprising executing a plurality of processes of a selected category of processes in parallel.

6. The computer-implemented method of claim 5, wherein the selected category of processes comprises administrative processes.

7. The computer-implemented method of claim 1, further comprising:
- initiating execution of a process of a category of processes of the plurality of categories of processes;
- determining whether a configuration change in the IT environment has occurred since creation of the process; and
- invalidating the process, in response to the determining indicating the configuration change.

8. The computer-implemented method of claim 7, wherein the determining comprises comparing state of the IT environment at time of creation of the process and state of the current IT environment to detect whether there is a configuration change.

9. The computer-implemented method of claim 1, further comprising:
- executing a process of a category of processes; and
- determining that the process has terminated abnormally.

10. A system of managing processing within a computing environment, said system comprising:
- a memory storing a plurality of categories of processes programmatically provided without user intervention, said plurality of categories having a plurality of priorities associated therewith, and wherein the plurality of categories comprises one or more of a category of critical processes, a category of monitoring processes, a category of preparatory processes, and a category of administrative processes, and wherein each category of the plurality of categories has a serialization protocol associated therewith to manage processing among the plurality of categories, and wherein the serialization protocol for one category is different from the serialization protocol of another category; and
- a processor to programmatically prevent execution of a process of one category of processes and allow execution of a process of another category of processes, in response to detecting a change in configuration of an Information Technology (IT) environment, wherein the change in configuration comprises at least one of adding one or more resources to the IT environment to be used by a business application of the IT environment that employs a plurality of types of resources, removing one or more resources from the IT environment that are used by a business application that employs a plurality of types of resources, or altering a management policy of the IT environment, and wherein the preventing execution comprises blocking execution of the process or terminating execution of the process.

11. The system of claim 10, wherein the programmatically preventing comprises using serialization to control execution of processes, in which the execution of the process of the one category is prevented and execution of the process of the another category is allowed.

12. The system of claim 10, wherein the plurality of categories comprises a category of critical processes, a category of monitoring processes, a category of preparatory processes, and a category of administrative processes.

13. A computer program product for managing processing within a computing environment, said computer program product comprising:
- a non-transitory computer readable storage medium readable by a processor and storing instructions for execution by the processor for performing a method comprising:
- programmatically providing, without user intervention, a plurality of categories of processes, said plurality of categories having a plurality of priorities associated therewith, and wherein the plurality of categories comprises one or more of a category of critical processes, a category of monitoring processes, a category of preparatory processes, and a category of administrative processes, and wherein each category of the plurality of categories has a serialization protocol associated therewith to manage processing among the plurality of categories, and wherein the serialization protocol for one category is different from the serialization protocol of another category; and
- programmatically preventing execution, by a processor, of a process of one category of processes and allowing execution of a process of another category of processes, in response to detecting a change in configuration of an Information Technology (IT) environment, wherein the change in configuration comprises at least one of adding one or more resources to the IT environment to be used by a business application of the IT environment that employs a plurality of types of resources, removing one or more resources from the IT environment that are used by a business application that employs a plurality of types of resources, or altering a management policy of the IT environment, and wherein the preventing execution comprises blocking execution of the process or terminating execution of the process.

14. The computer program product of claim 13, wherein the programmatically preventing comprises using serialization to control execution of processes, in which the execution of the process of the one category is prevented and execution of the process of the another category is allowed.

15. The computer program product of claim 13, wherein the method further comprises:
- initiating execution of a process of a category of processes of the plurality of categories of processes;
- determining whether a configuration change in the IT environment has occurred since creation of the process; and
- invalidating the process, in response to the determining indicating the configuration change.

16. The computer program product of claim 13, wherein the method further comprises:
- executing a process of a category of processes; and
- determining that the process has terminated abnormally.

* * * * *